United States Patent [19]
Ariyama et al.

[11] Patent Number: 5,129,630
[45] Date of Patent: Jul. 14, 1992

[54] PREREDUCTION FURNACE OF A SMELTING REDUCTION FACILITY OF IRON ORE

[75] Inventors: Tatsuro Ariyama; Jiro Mase; Yoshiyuki Kitano; Sakae Arakawa; Haruhito Tsuboi; Shinichi Isozaki; Hitoshi Kawata; Genji Kanatani, all of Kawasaki, Japan

[73] Assignee: NKK Corporation, Tokyo, Japan

[21] Appl. No.: 710,678

[22] Filed: Jun. 5, 1991

[30] Foreign Application Priority Data

| Jun. 16, 1990 | [JP] | Japan | 2-158156 |
| Jun. 16, 1990 | [JP] | Japan | 2-158157 |
| Jun. 16, 1990 | [JP] | Japan | 2-158158 |
| Jun. 27, 1990 | [JP] | Japan | 2-169190 |

[51] Int. Cl.$^5$ ............................................. C22B 5/14
[52] U.S. Cl. ........................................ 26/172; 75/446
[58] Field of Search .................. 266/172; 75/444, 446

[56] References Cited

U.S. PATENT DOCUMENTS 4,886,246 12/1989 Maeda et al. ............. 266/172

Primary Examiner—Melvyn J. Andrews
Attorney, Agent, or Firm—Frishauf, Holtz, Goodman & Woodward

[57] ABSTRACT

A prereduction furnace of a smelting reduction facility comprises a fluidizing prereduction chamber in the upper part of the prereduction furnace wherein iron ores are fed and prereduced, a gas blowing chamber installed in the lower part of the prereduction furnace wherein a reducing gas is fed, a distributor for separating the fluidizing prereduction chamber from the gas blowing chamber, and a discharge pipe for discharging the prereduced ore from the fluidizing prereduction chamber. The distributor includes a body of refractory material, a metal plate installed on the bottom of the body, nozzles passing through the body and the metal plate, metallic pipes inserted in the nozzles, and cooling pipes connected to the metal plate. A metallic box may be installed below the metal plate for providing passages for gas flow. A bottom plate may be installed spacedly below the metal plate, with nozzles passing therethrough. The distributor may comprise a rigid thick plate and a refractory layer thereon.

24 Claims, 28 Drawing Sheets

PREREDUCTION FURNACE OF A SMELTING REDUCTION FACILITY OF IRON ORE

BACKGROUND OF THE INVENTION

1. Field of the Invention

This invention relates to a prereduction furnace of a smelting reduction facility of iron ore.

2. Description of the Related Arts

A smelting reduction facility of iron ore includes a smelting reduction furnace and a fluidized bed type prereduction furnace. The exhaust gas generated from the smelting reduction furnace is used to fluidize and reduce iron ores in the fluidized bed in the prereduction furnace. The fluidized bed is preferably of a bubbling type that has almost reached technical finality and can prevent the degradation of ore due to preheating and reduction. The prereduction furnace has a distributor therein. The distributor has many nozzles for injecting gas. Iron ores are charged into a prereduction chamber formed above the distributor. Reducing gas from the smelting reduction furnace is introduced into a blowing chamber below the distributor. The reducing gas is blown out into the prereduction chamber above the distributor through the nozzles of the distributor. The reducing gas blown into the prereduction chamber forms a fluidized bed, in which prereduction and preheating of iron ore take place.

With regard to the prereduction furnace, the adhesion of dust contained in the reducing gas to the distributor presents a big problem. The exhaust gas generated from the smelting reduction furnace contains large amounts of dust. The fine particle dust of 10 microns and smaller in the gas cannot be removed by a cyclone or other dust collectors in most cases. The reducing gas containing fine particle dust is introduced into the prereduction furnace without removal of fine-grain dust. The dust, containing Na, K and other alkaline compounds and S in large quantities, is adherent in the reducing gas at temperatures above 900° C. Owing to this adhesion property, the dust introduced into the prereduction furnace adheres to the bottom of the distributor and the inside of the nozzle. In particular, the dust tends to adhere firmly to the inside of the nozzle because the reducing gas introduced into the blowing chamber is contracted when passing through the nozzle, resulting in a flow velocity of gas as high as about 100 m/sec in the nozzle. The adherent dust builds up gradually, preventing the smooth flow of reducing gas and the formation of a proper fluidized bed.

SUMMARY OF THE INVENTION

An object of the present invention is to provide a prereduction furnace that effectively prevents the adhesion of dust to the distributor.

To attain the above object, this invention provides a prereduction furnace of smelting reduction facility comprising:
- a fluidizing prereduction chamber installed in the upper part of the prereduction furnace wherein iron ores are fed and prereduced;
- a gas blowing chamber installed in the lower part of the prereduction furnace wherein a reducing gas is fed;
- a distributor for separating said fluidizing prereduction chamber from the gas blowing chamber;
- a discharge pipe for discharging the prereduced ore from the fluidizing prereduction chamber; and
the distributor including:
- a body of refractory material;
- a metal plate installed on the bottom of the body;
- nozzles passing through the body and the metal plate;
- metallic pipes inserted in the nozzles; and
- cooling pipes connected to the metal plate.

Alternatively, the distributor may include a body of refractory material, a metal plate installed at the bottom of the body, nozzles passing through the body and the metal plate, metallic pipes inserted in the nozzles, cooling pipes connected to the metal plate, a metallic box installed below the metal plate that has passages for flowing a gas, said metallic box having nozzles following said first-mentioned nozzles.

In another arrangement, the distributor may include a body of refractory material, a metal plate installed on the bottom of the body, nozzles passing through the body and the metal plate, first metallic pipes inserted in the nozzles, cooling pipes connected to the metal plate, a bottom plate spaced from the metal plate thereunder, and second metallic pipes connected to the lower ends of first metallic pipes, whose lower ends lead to the lower surface of the bottom plate, said metal plate, said bottom plate and said second metallic pipes defining a chamber surrounded by them.

In a further arrangement, the distributor may include a body of refractory material, a metal plate installed at the bottom of the body, nozzles passing through the body and the metal plate, first metallic pipes inserted in the nozzles, cooling pipes connected to the metal plate, a bottom plate fixed below the metal plate, second metallic pipes connected to the lower ends of first metallic pipes, whose lower ends lead to the lower surface of the bottom plate.

In a still further arrangement, the distributor may include a rigid thick plate having passages for flowing a cooling fluid therein, said thick plate having first nozzles opening in the vertical direction, and a refractory layer installed on top of the thick plate, said refractory layer having second nozzles whose diameter expands upward.

DETAILED DESCRIPTION PREFERRED EMBODIMENT 1

Figure 1:
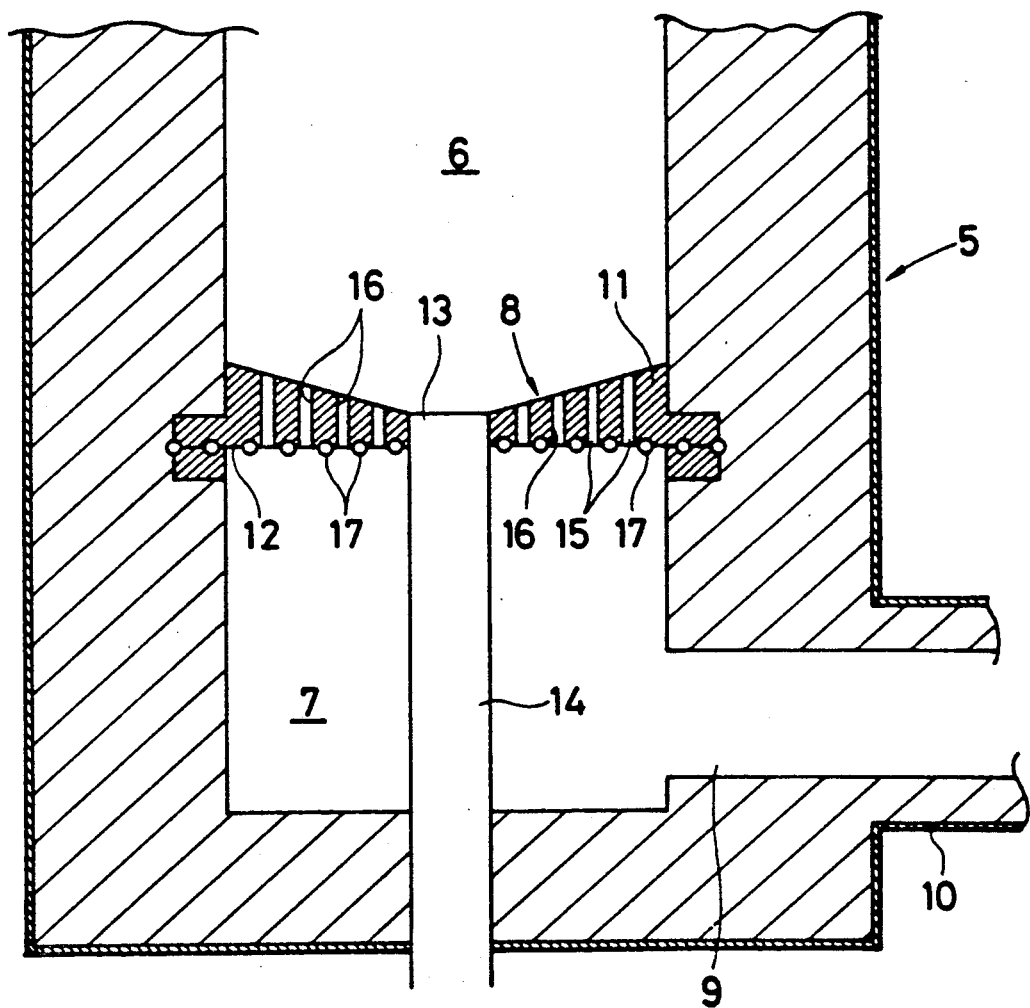
FIG. 1 is a vertical sectional view of the lower part of prereduction furnace in preferred embodiment 1.
Figure 2:
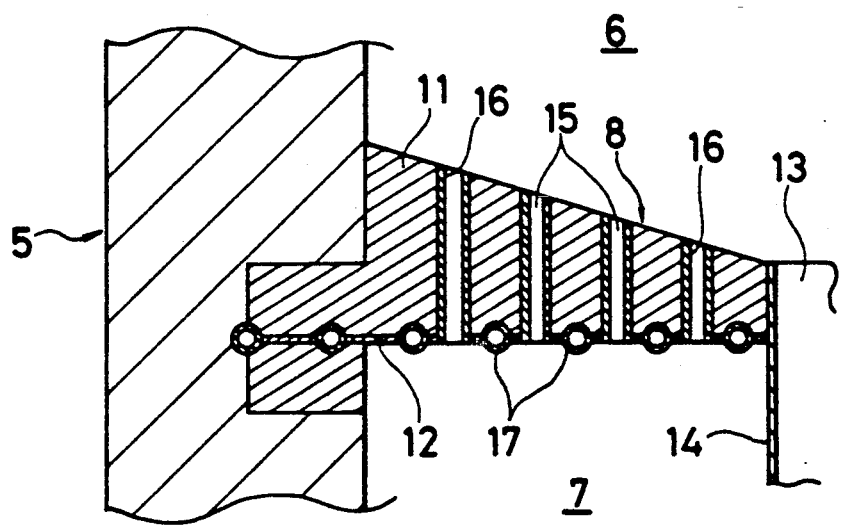
FIG. 2 is a vertical sectional view of a distributor in preferred embodiment 1.
Figure 3:
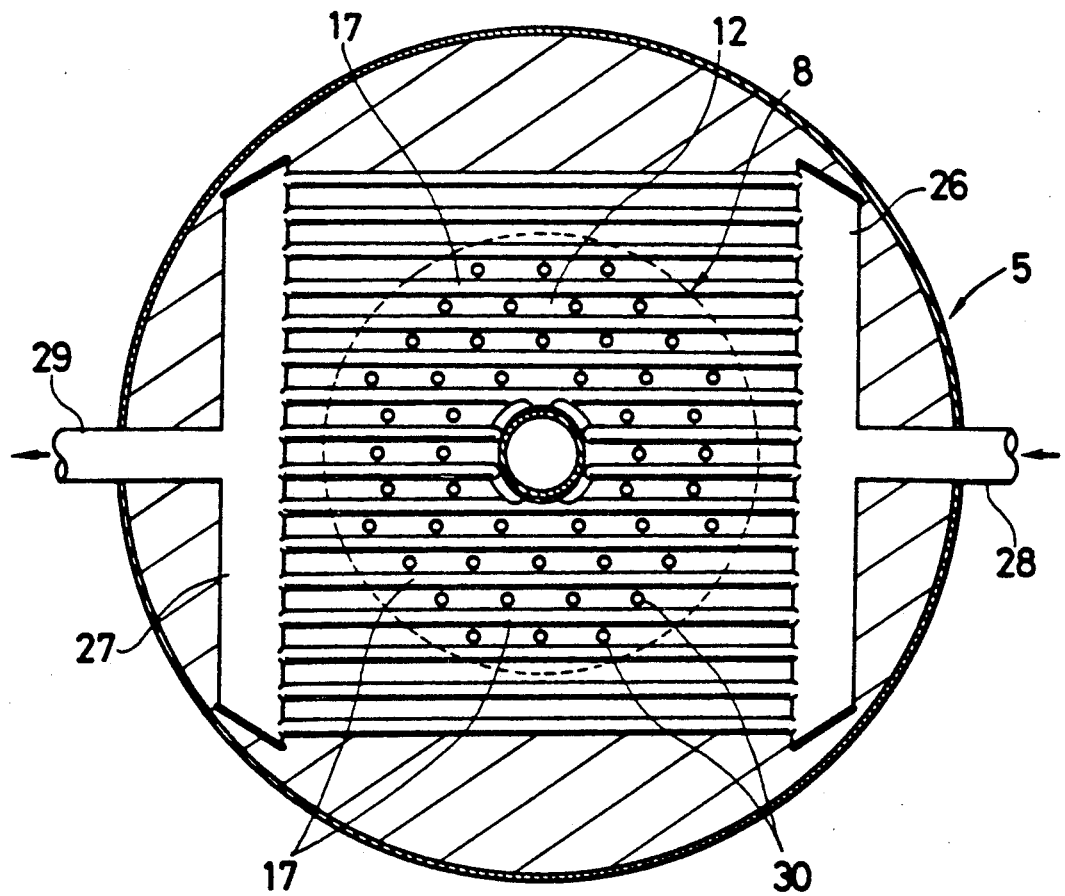
FIG. 3 is a plan view of metal plate and cooling pipes of the distributor in preferred embodiment 1.

FIGS. 1 to 3 show one preferred embodiment of this invention. Reference numeral 5 denotes a body of the prereduction furnace, and 8 denotes a distributor partitioning the inside of the furnace. The upper part of the furnace above the distributor 8 constitutes a prereduction chamber 6, and the lower part below the distributor a gas blowing chamber 7. The blowing chamber 7 is equipped with a gas blowing inlet 9, to which is connected a gas supply pipe 10 that leads from the smelting reduction furnace.

The distributor 8 has many vertical nozzles 15. The distributor 8 comprises a body 11 made of a refractory material, a metal plate 12 installed on the bottom of body 11, metallic pipes 16 inserted in the nozzles 15, and cooling pipes 17 installed along the bottom of the body 11 for flowing a cooling fluid. The metal plate 12 is fixedly secured to the body 11 of a refractory material so as to cover the entire bottom of the body 11. Holes are made in the metal plate 12 at the positions where the nozzles are formed. The metallic pipes 16 are inserted in the nozzles 15. The bottom end of metallic pipe 16 is joined to the periphery of the hole made in the metal plate 12 by welding or other means. A plurality of cooling pipes 17 are arranged in parallel with each other along the bottom of the body 11. The cooling pipes 17 are joined to the metal plate 12 lengthwise by welding or other means. In this preferred embodiment, the upper half of each cooling pipe 17 is embedded in the body 11. Therefore, the metal plate 12 is joined to the horizontal sides of cooling pipe 17. FIG. 3 is a plan view of metal plate 12 and cooling pipes 17 comprising the distributor. The cooling pipes 17 arranged in parallel with each other are connected to headers 26 and 27 at each end. The headers 26 and 27 are connected to an intake pipe 28 and a discharge pipe for a cooling fluid, respectively. Reference numeral 30 denotes the nozzle hole made in metal plate 12. The cooling pipes 17 are preferably arranged at both sides of the nozzles 15 as shown in this preferred embodiment. In the center of the distributor is located an ore discharging hole 13, to which a discharge pipe 14 is connected.

This invention can be applied to not only a distributor with an upper surface conically sloping down toward the center as shown in FIG. 1 but also a distributor with a level upper surface. The sectional form and planar arrangement of cooling pipes are not limited to the above preferred embodiment, but the cooling pipes can be configured in an appropriate form.

Figure 4:
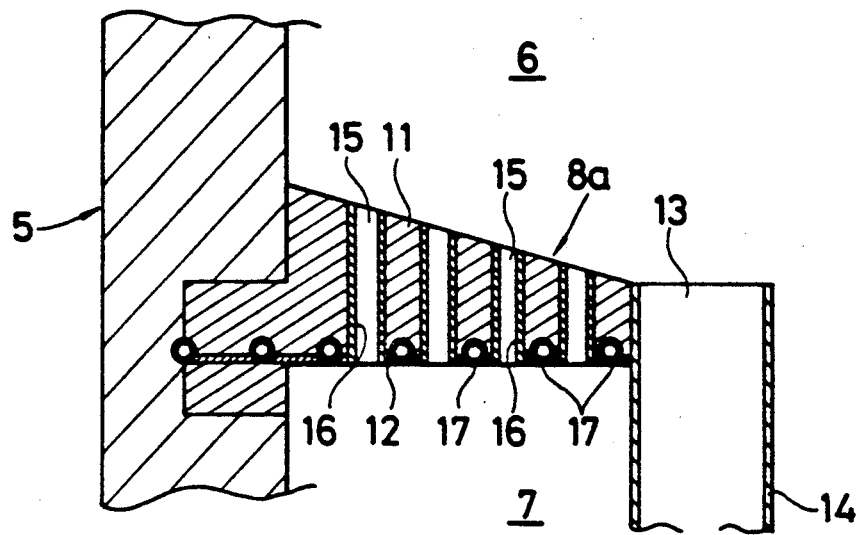
FIG. 4 is a vertical sectional view of a second distributor in preferred embodiment 1.

FIG. 4 shows a distributor in which the cooling pipes are disposed in such a manner that they do not protrude from the bottom of metal plate. Most of each cooling pipe 17 comprising the distributor 8a is embedded in the body 11, and the bottom of cooling pipe 17 is flush with the bottom surface of metal plate 12. Other configurations are the same as those shown in FIG. 1, and like reference numerals designate like or corresponding parts in these two figures. The arrangement of cooling pipes 17 is not limited to the embodiment shown in FIG. 4. The bottom of cooling pipe 17 may be joined to the upper surface of metal plate 12, or it may be joined via connecting members.

Figure 5:
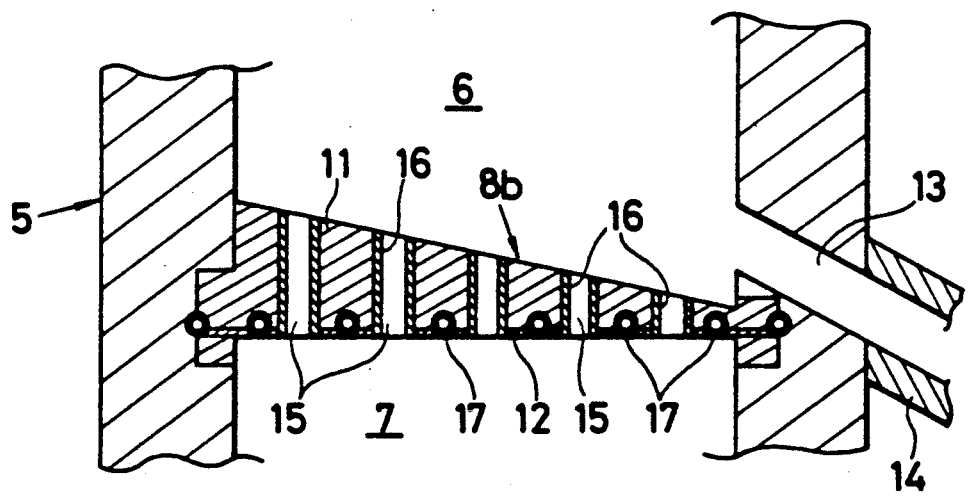
FIG. 5 is a vertical sectional view of a third distributor in preferred embodiment 1.

FIG. 5 shows a preferred embodiment in which the ore discharging hole 13 is located at the side of the distributor 8b. The distributor 8b is constructed so that its upper surface slopes downward toward the ore discharging hole 13. Other configurations are the same as those shown in FIG. 4, and like reference numerals designate like or corresponding parts in these two figures. In the distributor shown in FIG. 5, the cooling pipes 17 and the metal plate 12 can be constructed as shown in FIG. 1; that is, the cooling pipes 17 can be disposed so that their upper halves are embedded in the body 11.

Figure 6:
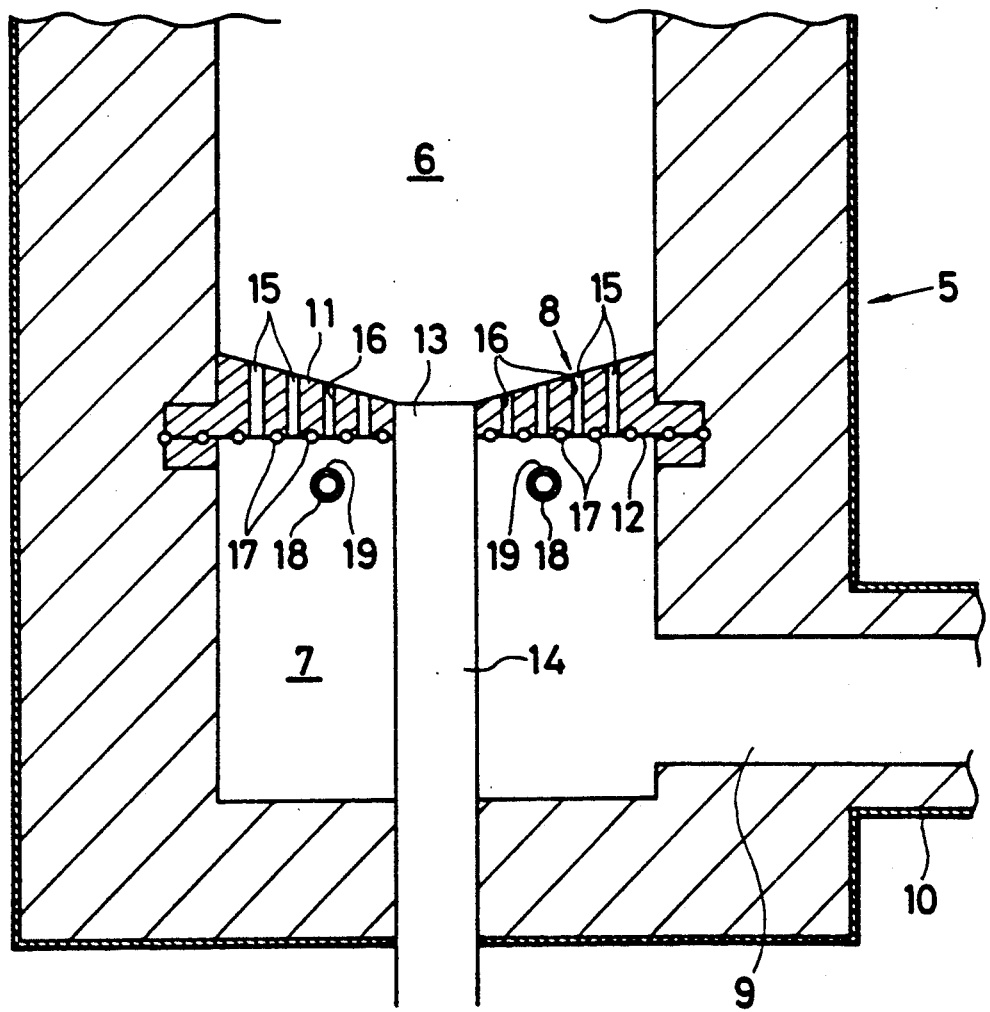
FIG. 6 is a vertical sectional view of the lower part of prereduction furnace having a purging device in preferred embodiment 1.
Figure 7:
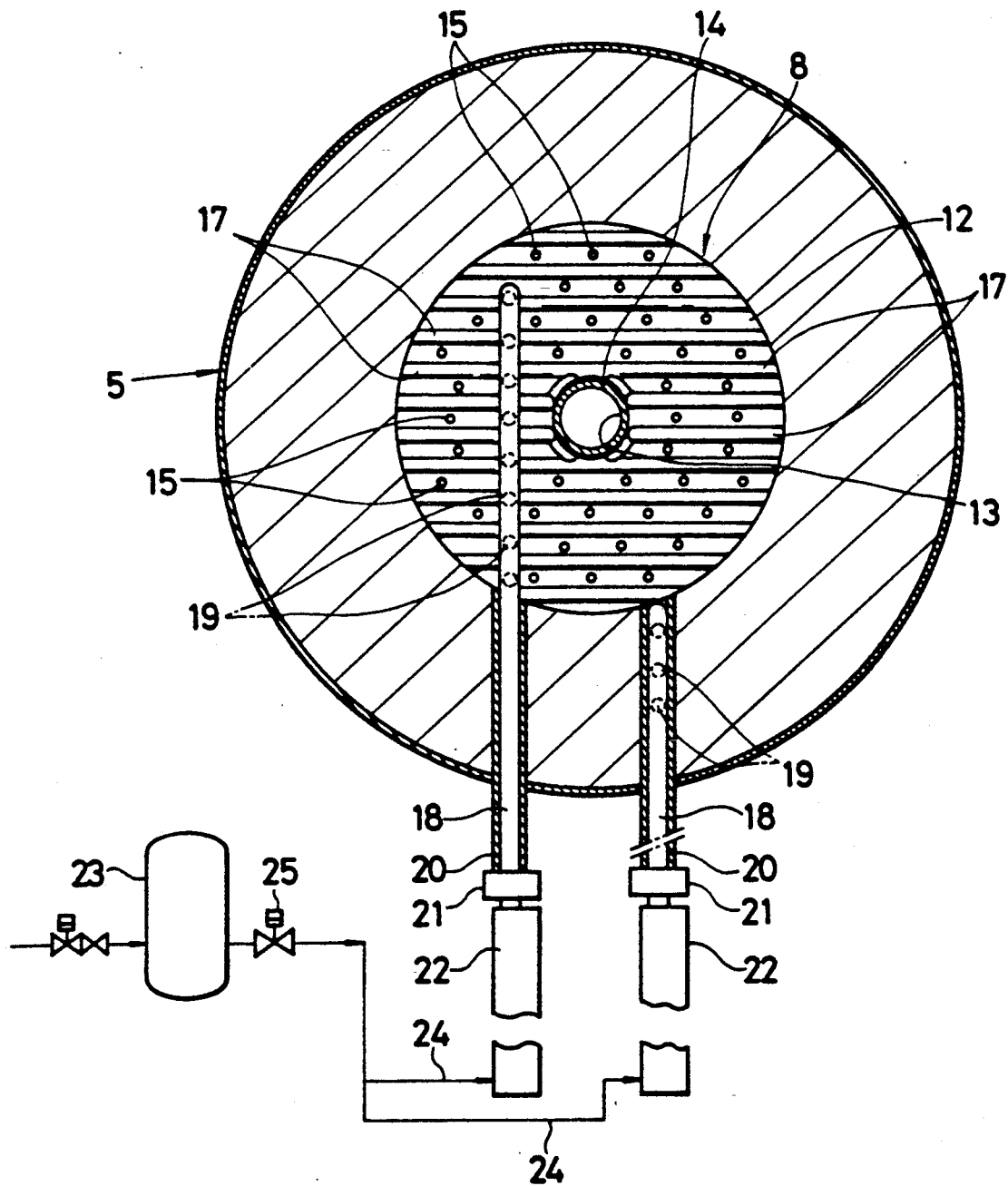
FIG. 7 is a partially sectional view of horizontal arrangement of purging device in preferred embodiment 1.

FIGS. 6 and 7 show a preferred embodiment in which purging pipes are installed below the distributor. The configuration of distributor is the same as that shown in FIG. 1. Below the distributor, two purging pipes 18 are installed in a horizontally movable manner so that the ore discharging pipe is interposed between them. The furnace body 5 has sleeves 20 passing through its side wall. The gas injection pipe 18 can be moved into and out of the blowing chamber 7 through the sleeve 20. To move the purging pipes 18 horizontally, driving mechanisms 21 are installed outside the furnace body. The driving mechanism 21 is, for example, made up of a reciprocating chain that is locked to a protrusion on the furnace outside. Therefore, the reciprocating movement of chain allows the purging pipe 18 to move into and out of the blowing chamber 7 through the sleeve 20. To the rear end of purging pipe 18 extending from the furnace is connected a gas blowing pipe 22, to which a gas supply pipe 24 is connected from a gas source 23. A valve 25 is installed midway in the gas supply pipe 24. The purging pipe 18 may be so constructed as to be rotated around its axis by a driving mechanism not shown in the figure. These purging pipes can be installed in the furnace having the distributor shown in FIG. 4 or 5.

Figure 8:
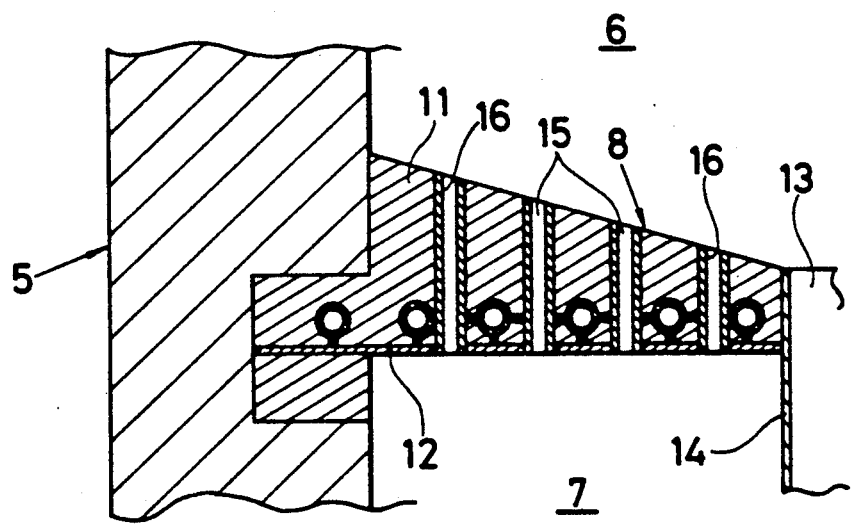
FIG. 8 is a vertical sectional view of another distributor in preferred embodiment 1.

In this preferred embodiment, instead of the cooling pipes 17, other cooling pipes may be embedded in the body 11 at positions above the cooling pipes 17. As shown in FIG. 8, the cooling pipes may be directly joined to the metallic pipes 16, or connected to the metallic pipes 16 or the metal plate 12 via connecting members.

Next, the operation of the reduction furnace of preferred embodiment 1 is explained. A cooling fluid is allowed to flow in the cooling pipes 17 composing of the distributor 8, 8a, or 8b. The cooling fluid used for this furnace is water or nitrogen gas. A liquid like water is preferable. The cooling fluid cools down the metal plate 12 connected to the cooling pipes 17. Then, the metallic pipes 16 inserted in the nozzles are cooled via the metal plate 12. The cooling down of metal plate 12 and in turn the metallic pipes 16 will reduce the temperature of the bottom of distributor and the inside of each nozzle. As a result, any dust in the reducing gas adhering to the bottom of distributor and the inside of nozzle will rapidly solidify, so that it can be easily removed. In this preferred embodiment, the top of distributor 8 is not cooled. This is because any dust adhering to the top of distributor 8 and the outlet of nozzle 15 is readily removed by the violent movement of fluidized ore particles. There is, therefore, almost no adhesion of dust commonly found on the bottom of distributor and the inside of nozzle. No cooling of the distributor top prevents the decrease in temperature in the fluidized bed due to the heat dissipation from the distributor top.

In the preferred embodiment shown in FIGS. 6 and 7, if dust adheres to the bottom of the distributor or the inlet of the nozzle, the dust can be easily removed by injecting a gas from the purging pipes 18. The purging pipes 18 are normally withdrawn to the outside of furnace. When gas is injected toward the bottom of the distributor 8 through the gas injection outlets 19, the purging pipes are advanced into the blowing chamber 7 by means of the driving mechanisms 21.

In the preferred embodiment shown in FIG. 4 or 5, because the cooling pipes are installed so that they do not protrude 116 prone to being turbulent, so that dust adheres less than in the preferred embodiment shown in FIG. 1. Generally, the conventional distributor made of only a refractory material has a thickness of about 700 mm. The distributor according to this invention has the metal plate 12 and cooling pipes 17 as strength members. The distributor also has high strength because it is cooled. For these reasons, the thickness of distributor can be reduced to about 200 mm. Therefore, the area where the reducing gas passing through the nozzle 15 comes into contact with the inside of nozzle is far smaller than with the conventional distributor of refractory material only, so that the decrease in temperature of reducing gas in passing through the nozzle hardly presents any problem.

PREFERRED EMBODIMENT 2

FIGS. 9 to 12 show the preferred embodiment 2 of this invention. Reference numeral 5 denotes a body of a prereduction furnace, and 8 denotes a distributor partitioning the inside of the furnace. The upper part of the furnace above the distributor 8 constitutes a prereduction chamber 6, and the lower part below the distributor a gas blowing chamber 7. The blowing chamber 7 is equipped with a gas blowing inlet 9, to which is connected a gas supply pipe 10 that leads from the smelting reduction furnace.

Figure 11:
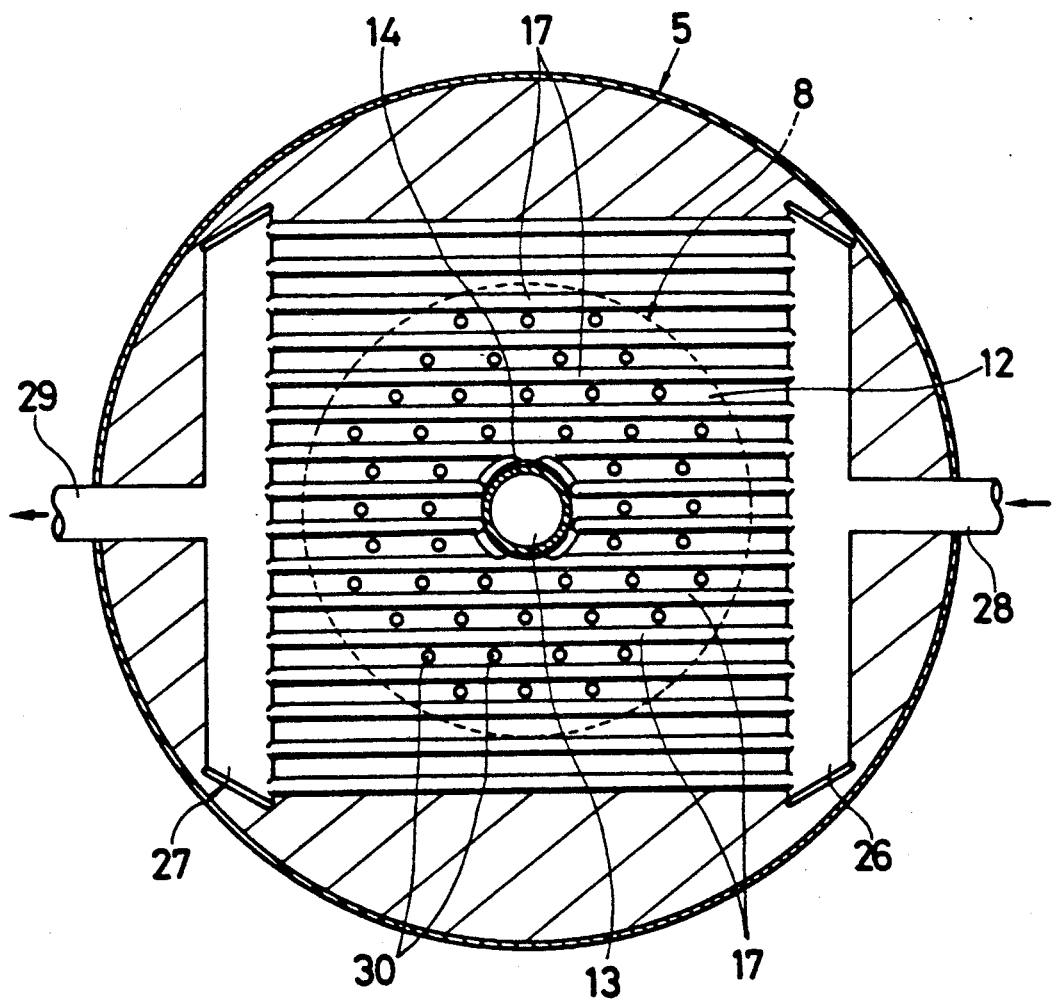
FIG. 11 is a plan view of a metal plate and cooling pipes of the distributor in preferred embodiment 2.

The distributor 8 has many vertical nozzles 15. The distributor 8 comprises a body 11 made of a refractory material, a metal plate 12 installed on the bottom of body 11, metallic pipes 16 inserted in the nozzles 15, cooling pipes 17 installed along the bottom of the body 11 for flowing a cooling fluid, and a metallic box 31 installed below the metal plate 12 that has passages for cooling the gas therein. The metal plate 12 is fixedly secured to the body 11 of a refractory material so as to cover the entire bottom of the body 11. Holes are made in the metal plate 12 at the positions where the nozzles are formed. The metallic pipes 16 are inserted in the nozzles 15a. The bottom end of metallic pipe 16 is joined to the periphery of the hole made in the metal plate 12 by welding or other means. A plurality of cooling pipes 17 are arranged in parallel with each other along the bottom of the body 11. The cooling pipes 17 are joined to the metal plate 12 lengthwise by welding or other means. In this preferred embodiment, the upper half of each cooling pipe 17 is embedded in the body 11. Therefore, the metal plate 12 is joined to the horizontal sides of cooling pipe 17. FIG. 11 is a plan view of metal plate 12 and cooling pipes 17 comprising the distributor. The cooling pipes 17 arranged in parallel with each other are connected to headers 26 and 27 at each end. The headers 26 and 27 are connected to an intake pipe 28 and a discharge pipe for a cooling fluid, respectively. Reference numeral 30 denotes the nozzle hole made in metal plate 12. The cooling pipes 17 are preferably arranged at both sides of the nozzles 15a as shown in this preferred embodiment.

The metallic box 31 is made of a casting or other metals. The metallic box 31 is installed throughout below the metal plate 12 so that the bottom of metallic box defines the bottom of distributor. The metallic box 31 has passages 32 therein. Nozzles 15b leading to the metallic pipes 16 are disposed vertically in walls 33 partitioning the passages 32. The metallic box 31 has an intake port 34 and a discharge port 35 leading to the passages 32 to introduce and discharge a cooling gas. To the intake port 34 and the discharge port 35 are connected a gas supply pipe 38 and a discharge pipe 39, respectively.

Figure 12:
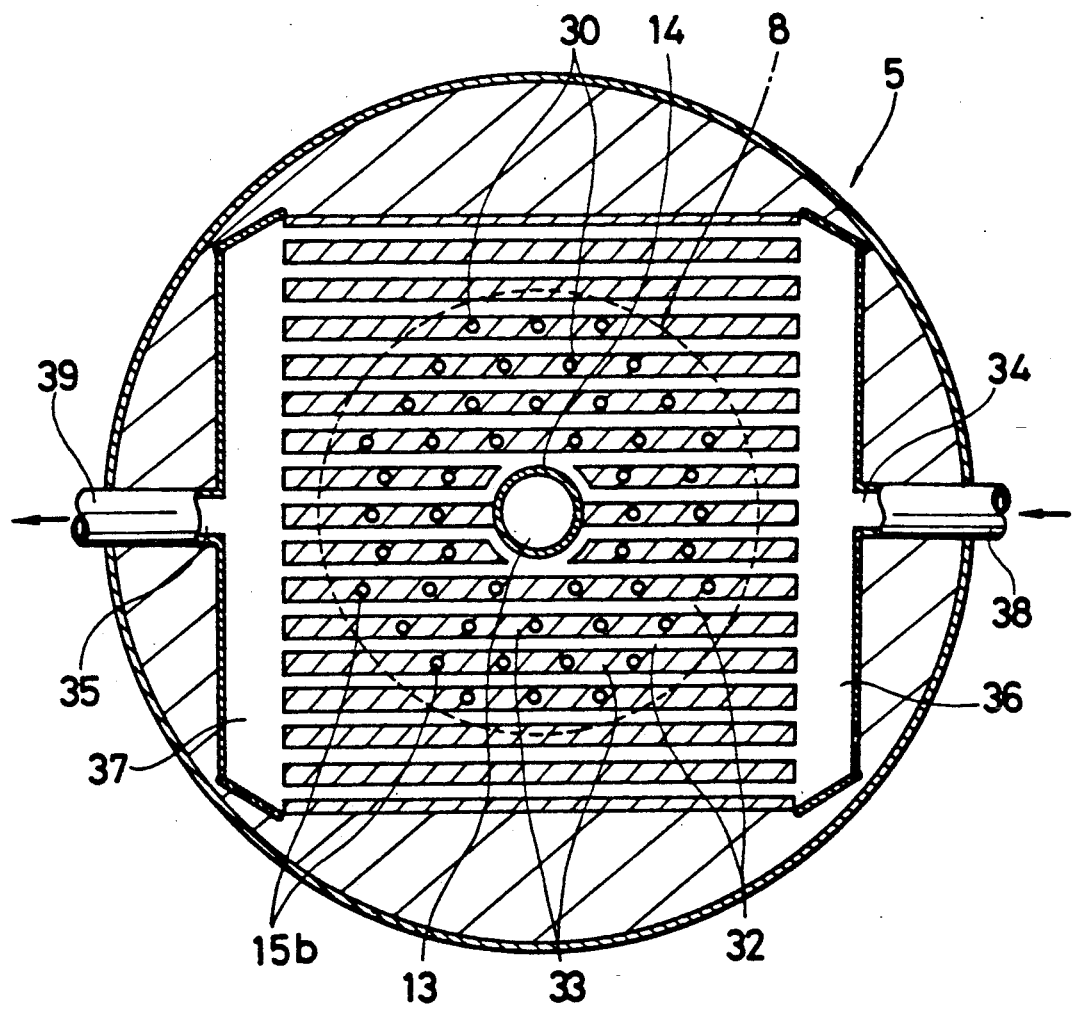
FIG. 12 is a horizontal sectional view of metallic box of the distributor in preferred embodiment 2.

The inner construction of the metallic box 31 is not particularly limited. FIG. 12 is a horizontal sectional view showing a typical inner construction of metallic box 31. The metallic box 31 has many passages arranged in parallel with each other therein. The passages 32 are connected to headers 36 and 37 at each end. The headers 36 and 37 have the intake port 34 and the discharge port 35 to introduce and discharge a cooling gas, respectively. To the intake port 34 is connected the gas supply pipe 38, and to the discharge port the discharge pipe 39. In the wall 33 partitioning the passages 32 are disposed the nozzles 15b.

In the center of the distributor 8 is located an ore discharging hole 13, to which an ore discharging pipe 14 is connected.

Figure 9:
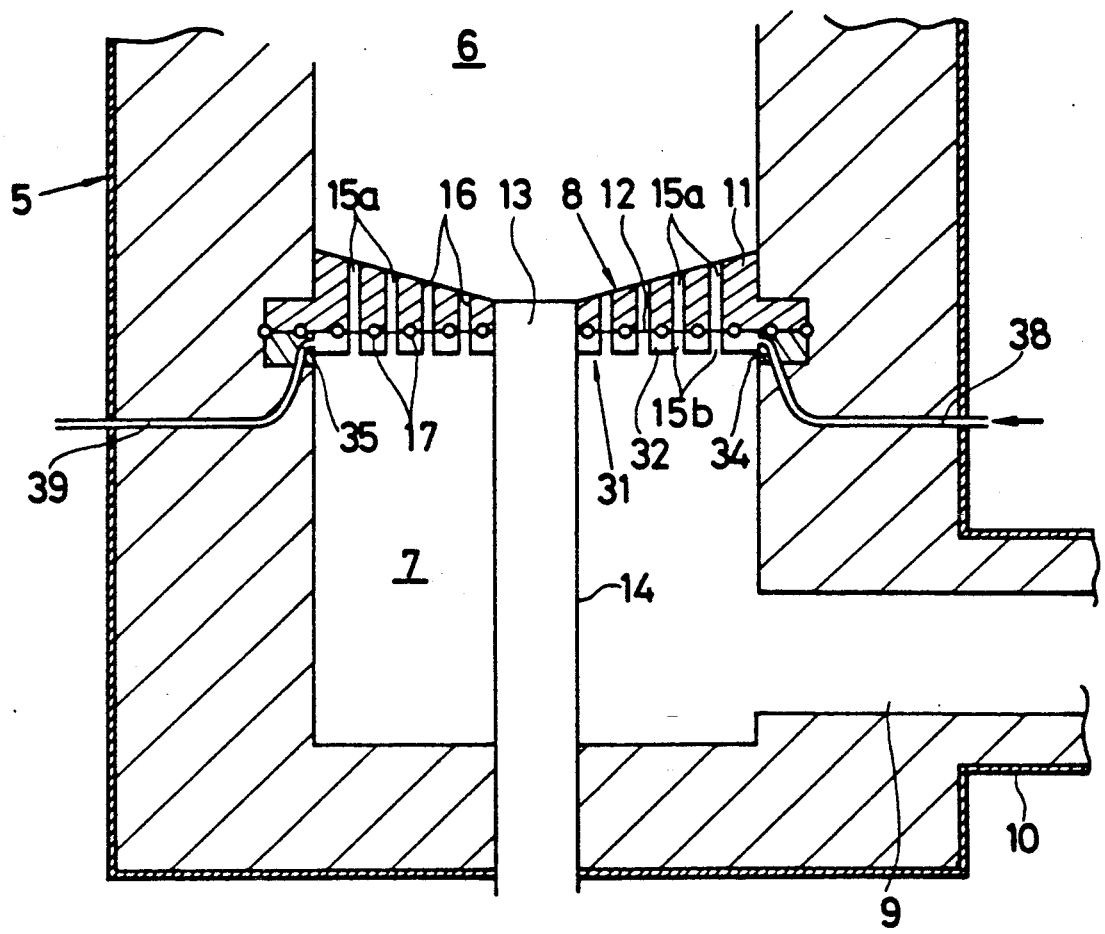
FIG. 9 is a vertical sectional view of the lower part of prereduction furnace in preferred embodiment 2.
Figure 10:
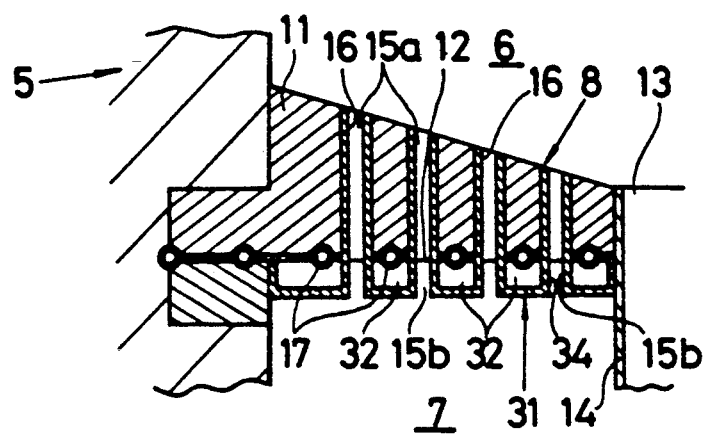
FIG. 10 is a vertical sectional view of a distributor in preferred embodiment 2.
Figure 13:
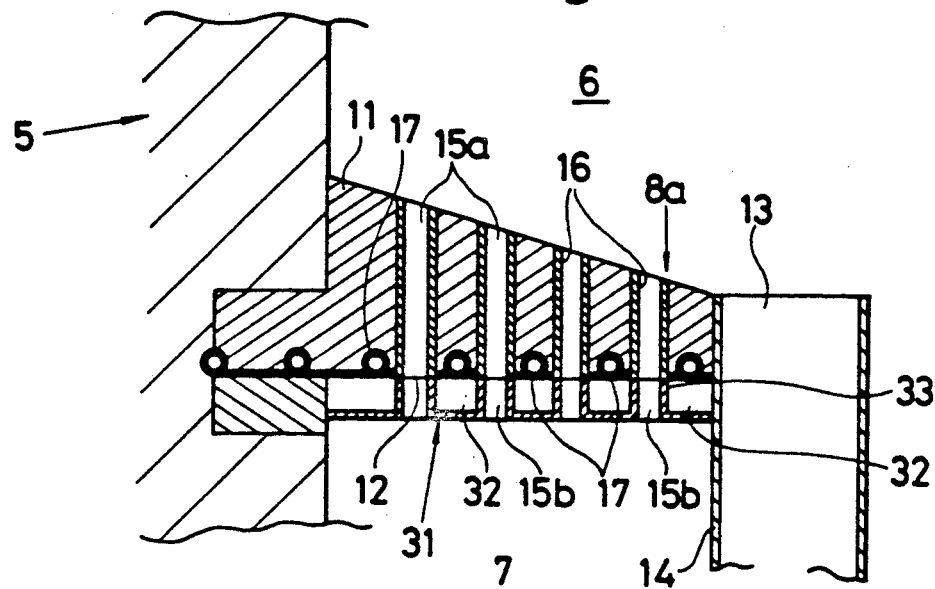
FIG. 13 is a vertical sectional view of a second distributor in preferred embodiment 2.

This invention can be applied to not only a distributor with an upper surface conically sloping down toward the center as shown in FIG. 9 but also a distributor with a level upper surface. The sectional form and planar arrangement of cooling pipes are not limited to the above preferred embodiment, but the cooling pipes can be configured in an appropriate form. FIG. 13 shows a distributor in which the cooling pipes are disposed differently. Most part of each cooling pipe 17 of the distributor 8a is embedded in the body 11, and the bottom of cooling pipe 17 is flush with the bottom surface of metal plate 12. Other configurations are the same as those shown in FIG. 9, like reference numerals designating like or corresponding parts in these two figures for omitting the explanation. Instead of the embodiment shown in FIG. 13, the bottom of cooling pipes 17 may be joined to the upper surface of metal plate 12. Alternatively, the cooling pipes 17 may be completely embedded in the body 11 and connected to the metal plate 12 via connecting members. The cooling pipe 17 is preferably joined to the metal plate 12 throughout its length, but may be partially joined via connecting members.

Figure 14:
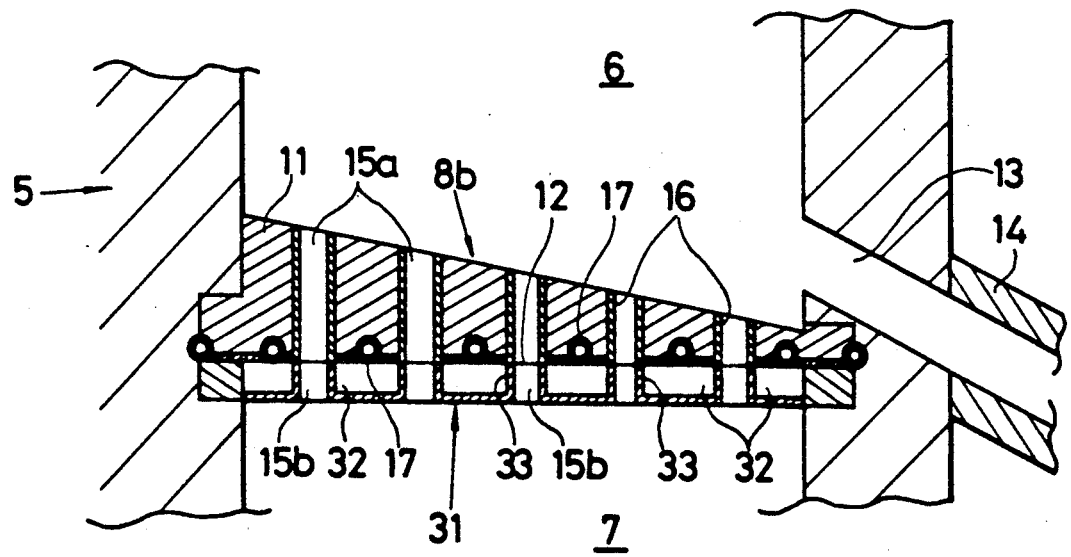
FIG. 14 is a vertical sectional view of a third distributor in preferred embodiment 2.

FIG. 14 shows a preferred embodiment in which the ore discharging hole 13 is located at the side of the distributor 8b. The distributor 8b is constructed so that its upper surface slopes downward toward the ore discharging hole 13. Other configurations are the same as those shown in FIG. 13, like reference numerals designating like or corresponding parts in these two figures for omitting the explanation. In the distributor shown in FIG. 14, the cooling pipes 17 and the metal plate 12 can be constructed as shown in FIG. 9; that is, the cooling pipes 17 can be disposed so that their upper halves are embedded in the body 11.

Figure 15:
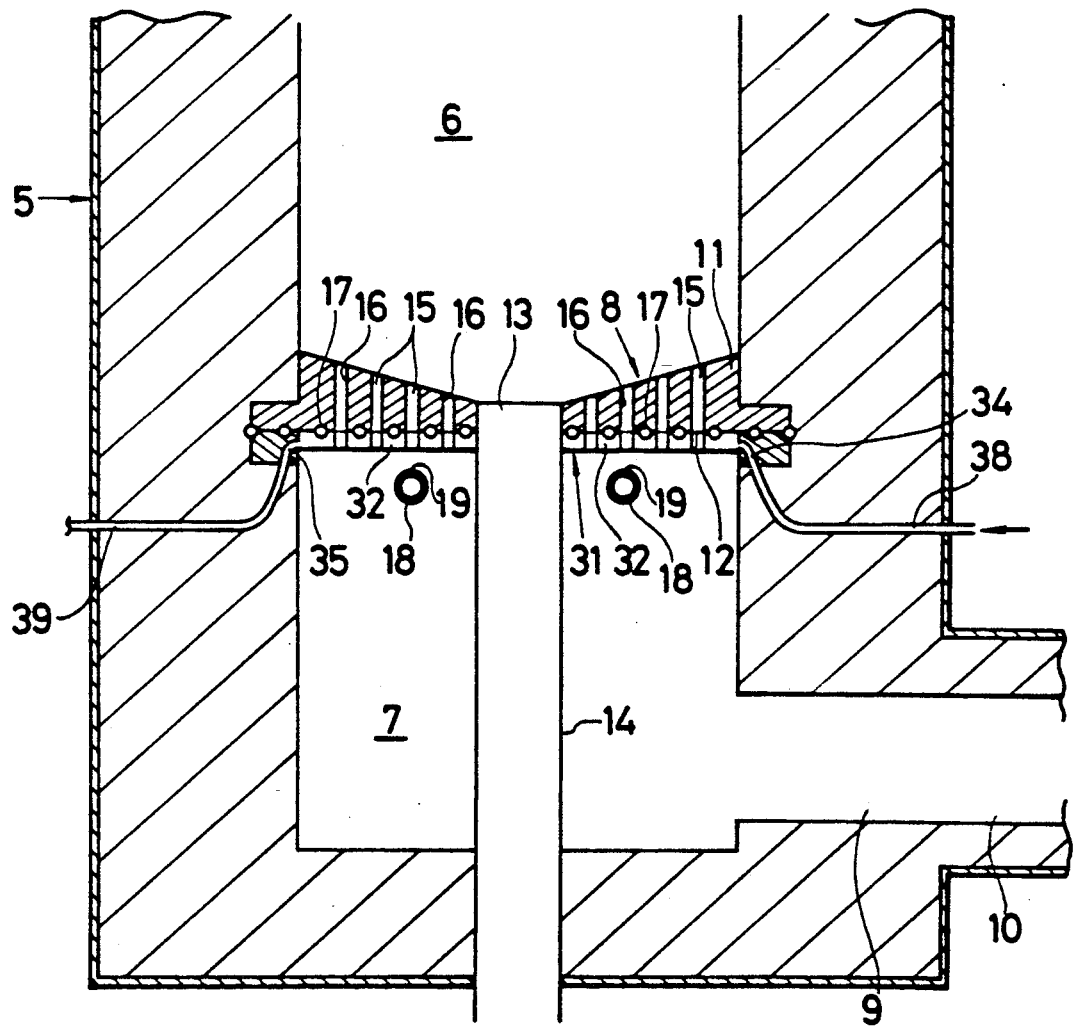
FIG. 15 is a vertical sectional view of the lower part of a prereduction furnace having a purging device in preferred embodiment 2.
Figure 16:
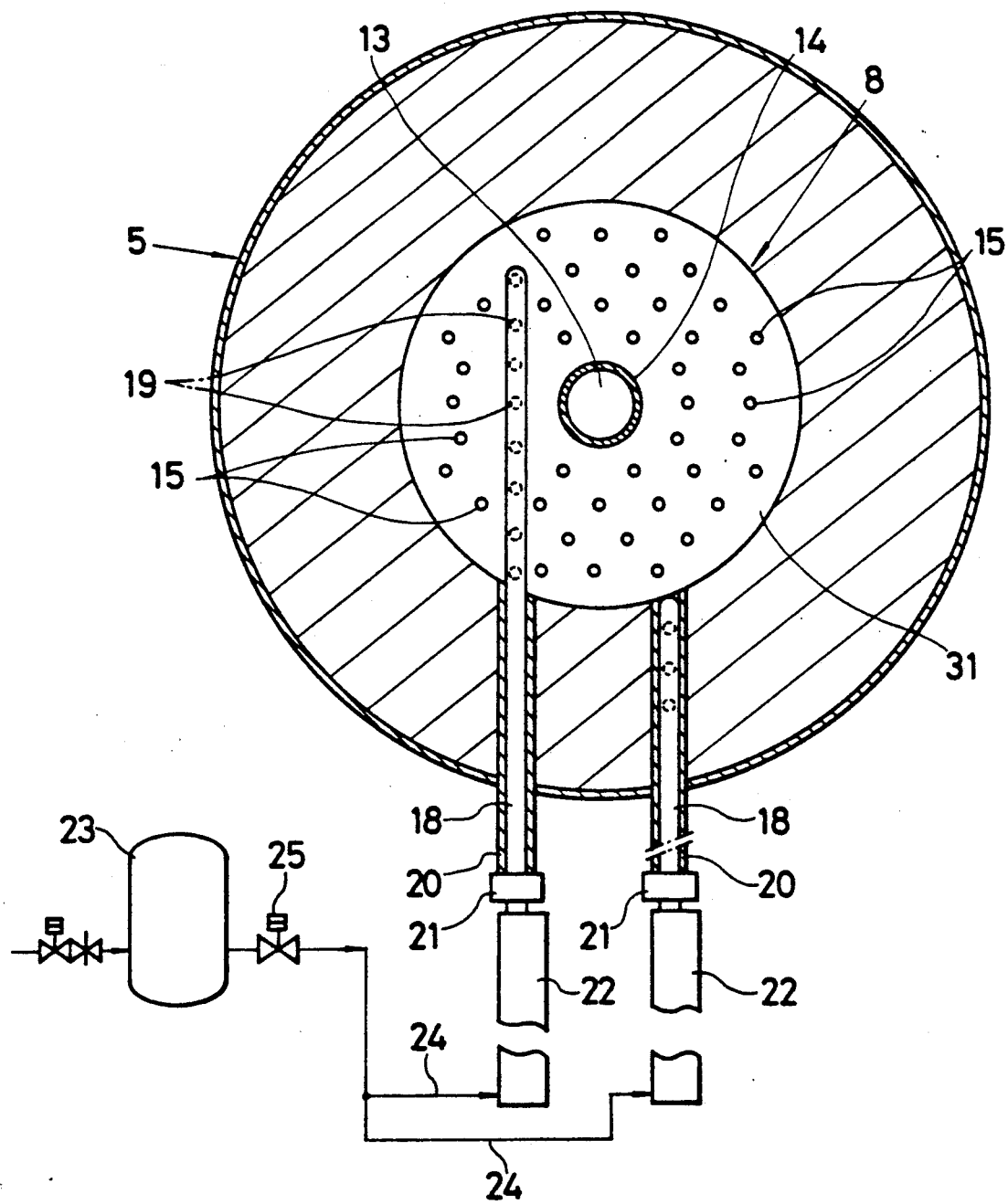
FIG. 16 is a partially sectional view of horizontal arrangement of purging device in preferred embodiment 2.

FIGS. 15 and 16 show a preferred embodiment in which purging pipes are installed below the distributor. The configuration of the distributor is the same as that shown in FIG. 9. Below the distributor, two purging pipes 18 are installed in a horizontally movable manner so that the ore discharge pipe is interposed between them. Each of the purging pipes 18 has a plurality of gas injection outlets 19 facing the bottom of the distributor. The furnace body 5 has sleeves 20 passing through its side wall. The purging pipe 18 can be moved into and out of the blowing chamber 7 through the sleeve 20. To move the gas injection pipes 18 horizontally, driving mechanisms 21 are installed outside the furnace body. The driving mechanism 21 is, for example, made up of a reciprocating chain that is locked to a protrusion on the furnace outside. Therefore, the reciprocating movement of the chain allows the purging pipe 18 to move into and out of the blowing chamber 7 through the sleeve 20. To the rear end of purging pipe 18 extending from the furnace is connected a gas blowing pipe 22, to which a gas supply pipe 24 is connected from a gas source 23. A valve 25 is installed midway in the gas supply pipe 24.

The purging pipe 18 may be so constructed as to be rotated around its axis by a driving mechanism not shown in the figure. These purging pipes can be installed in the furnace having the distributor shown in FIG. 13 or 14.

In this preferred embodiment, in addition to the cooling pipes 17, other cooling pipes may be embedded in the body 11 at positions above the cooling pipes 17. The cooling pipes may be directly joined to the metallic pipes 16, or may be connected to the metallic pipes 16 or the metal plate 12 via connecting members.

Next, the operation of preferred embodiment 2 is explained. A cooling fluid like water is allowed to flow in the cooling pipes 17 of the distributor 8, 8a, or 8b. The cooling fluid cools down the metal plate 12 connected to the cooling pipes 17. Then, the metallic pipes 16 inserted in the nozzles are cooled via the metal plate 12. Any adherent dust in the reducing gas adhering to the inside of metallic pipe 16 rapidly solidifies, so that it can be easily removed. In the metallic box 31, a cooling gas like nitrogen gas is allowed to flow. This cooling gas slowly cools down the bottom surface of metallic box 31 constituting the bottom of distributor. Any dust adhering to the bottom of the distributor can be easily peeled off even by such slow cooling because of its small adhesive force. The slow cooling of distributor bottom prevents the decrease in temperature of reducing gas in contact with the bottom of distributor.

In this preferred embodiment, the top of distributor 8 is not cooled. This is because any dust adhering to the top of distributor 8 and the outlet of nozzle 15 is readily removed by the violent movement of fluidized ore particles. There is, therefore, almost no adhesion of dust commonly found on the bottom of the distributor and the inside of the nozzle. No cooling of distributor top prevents the decrease in temperature in the fluidized bed due to the heat dissipation from the distributor top.

In the preferred embodiment shown in FIGS. 15 and 16, if dust adheres to the bottom of distributor or the inlet of nozzle, the dust can be easily removed by injecting gas from the purging pipes 18. The purging pipes 18 are normally withdrawn to the outside of the furnace and are advanced into the blowing chamber 7 by means of the driving mechanism 21 as appropriate. Generally, the conventional distributor made of only a refractory material has a thickness of about 700 mm. The distributor according to this invention has the metal plate 12, cooling pipes 17, and metallic box 31 as strength members. The distributor also has high strength because the metal plate 12, cooling pipes 17, and metallic box 31 are cooled. For these reasons, the thickness of distributor can be reduced to about 200 mm. Therefore, the area where the reducing gas passing through the nozzle 15 comes into contact with the inside of nozzle is far smaller than with the conventional distributor of refractory material only, so that the decrease in temperature of reducing gas in passing through the nozzle hardly presents any problem.

The installation of metallic box 31 reduces a difference in temperature between the area near the joint with the cooling pipe 17 and the area near the joint with the metallic pipe 16 on the metal plate 12, which prevents heat cracking of metal plate 12. Specifically, the cooling gas in the metallic box 31 prevents the area of metal plate 12 near the cooling pipe 17 from being excessively cooled by the heavy cooling due to the cooling pipe 17. This reduces a difference in temperature between the area near the cooling pipe 17 and the area near the joint with the metallic pipe 16 on the metal plate 12, preventing heat cracking of metal plate 12 due to an excessive difference in temperature.

PREFERRED EMBODIMENT 3

Figure 17:
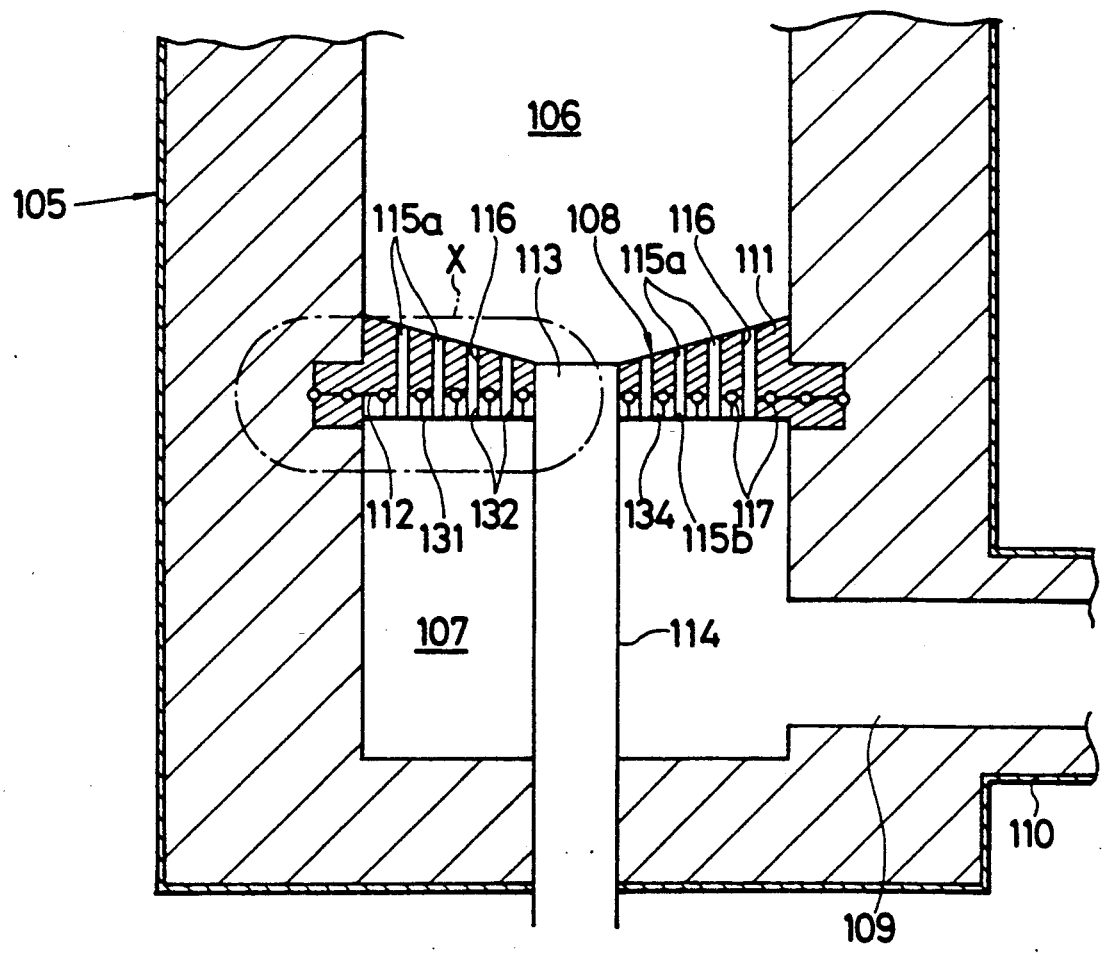
FIG. 17 is a vertical sectional view of the lower part of a prereduction furnace in preferred embodiment 3.
Figure 18:
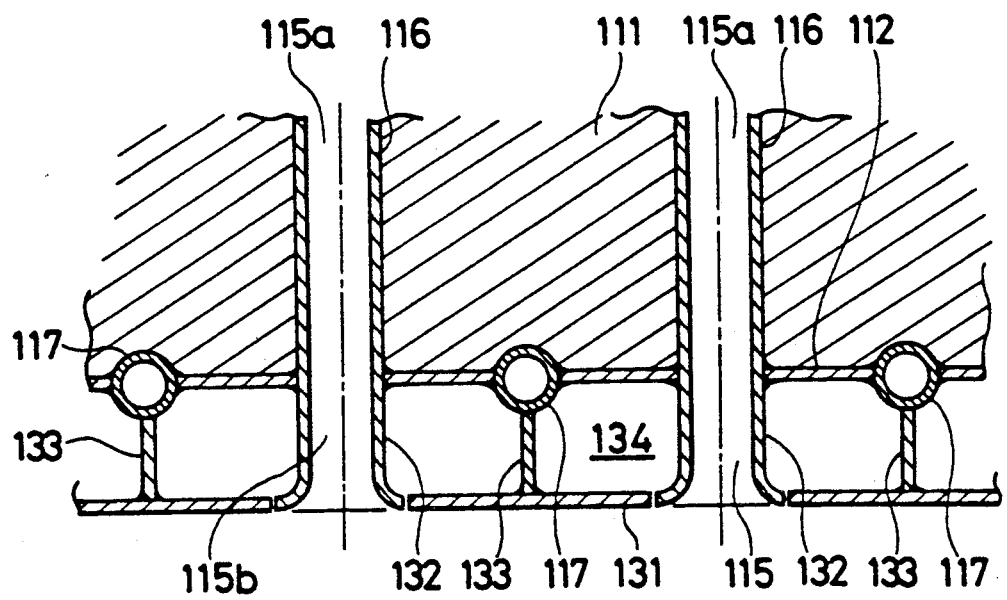
FIG. 18 is a vertical sectional view partially showing a lower construction of distributor in preferred embodiment 3.
Figure 19:
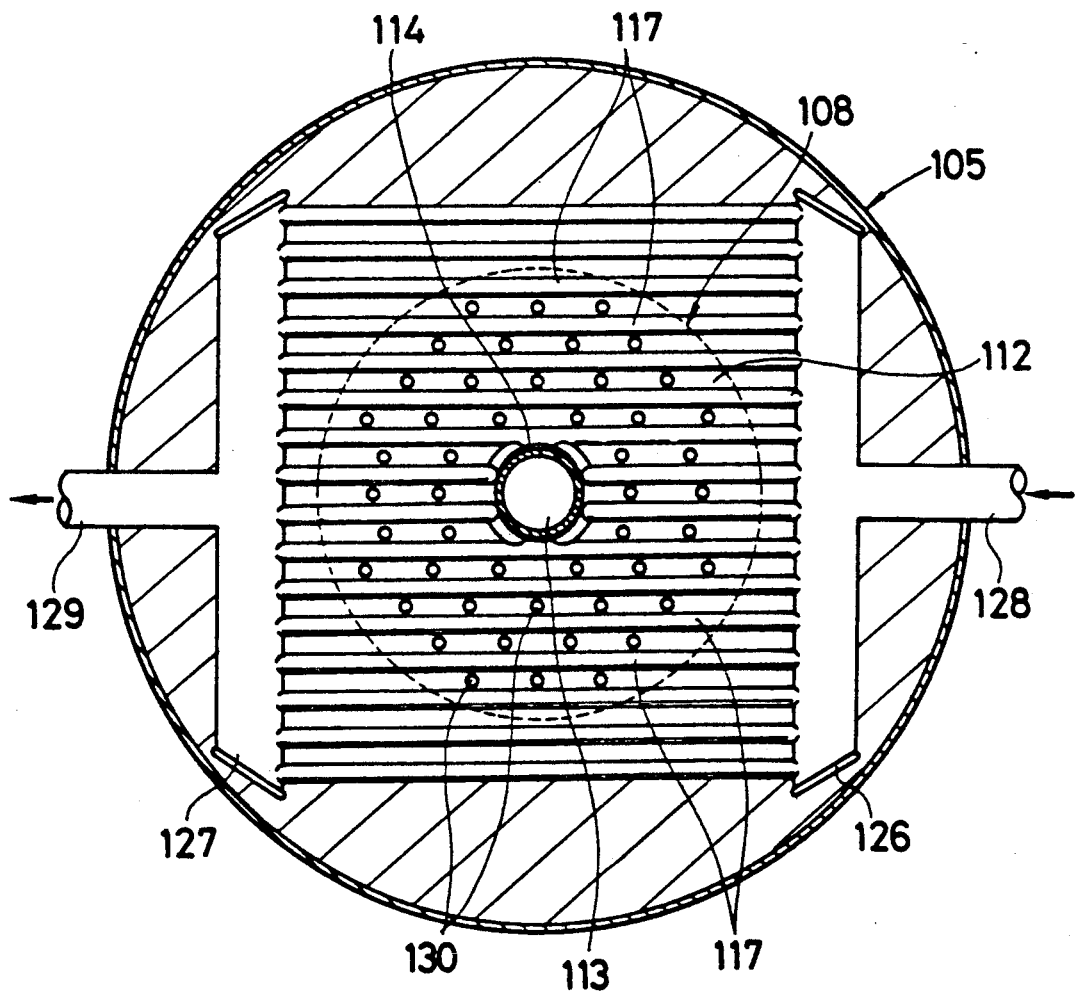
FIG. 19 is a plan view of metal plate and cooling pipes of the distributor in preferred embodiment 3.

FIGS. 17 to 19 show the preferred embodiment 3 of this invention. Reference numeral 105 denotes a body of prereduction furnace, and 108 denotes a distributor partitioning the inside of the furnace. The upper part of furnace above the distributor 108 constitutes a prereduction chamber 106, and the lower part below the distributor a blowing chamber 107. The blowing chamber 107 is equipped with a gas blowing inlet 109, to which is connected a gas supply pipe 110 that leads from the smelting reduction furnace.

The distributor 108 has many vertical nozzles 115a. The distributor 108 comprises a body 111 made of a refractory material, a metal plate 112 installed on the bottom of body 111, metallic pipes 116 inserted in the nozzles 115a, cooling pipes 117 installed along the bottom of the body 111 for flowing a cooling fluid, a bottom plate 131 spaced suitably from the metal plate 112 thereunder, and metallic pipes 132 installed at the lower ends of metallic pipes 116 for defining nozzles 115b between the metal plate 112 and the bottom plate 131. The nozzle 115b leads to the nozzle 115a.

The metal plate 112 is fixedly secured to the body 111 of a refractory material so as to cover the entire bottom of the body 111. Holes are made in the metal plate 112 at the positions where the nozzles are formed. The metallic pipes 116 are inserted in the nozzles 115a. The bottom end of metallic pipe 116 is joined to the periphery of the hole made in the metal plate 112 by welding or other means. A plurality of cooling pipes 117 are arranged in parallel with each other along the bottom of the body 111. The cooling pipes 117 are joined to the metal plate 112 lengthwise by welding or other means. In this preferred embodiment, the upper half of each cooling pipe 117 is embedded in the body 111. Therefore, the metal plate 112 is joined to the horizontal sides of cooling pipe 117. FIG. 19 is a plan view of metal plate 112 and cooling pipes 117 comprising the distributor. The cooling pipes 117 arranged in parallel with each other are connected to headers 126 and 127 at each end. The headers 126 and 127 are connected to an intake pipe 128 and a discharge pipe for a cooling fluid, respectively. Reference numeral 130 denotes the nozzle hole made in metal plate 112. The cooling pipes 117 are preferably arranged at both sides of the nozzles 115a as shown in this preferred embodiment.

The bottom plate 131 constitutes the bottom of the distributor. The bottom plate 131 is spaced suitably from the metal plate 112 thereunder. A chamber 134 is formed between the metal plate 112 and the bottom plate 131. In this preferred embodiment, a plate-shaped or rod-shaped connecting member 133 is installed between the cooling pipe 117 and the bottom plate 131. The metallic pipe 132 is installed at the lower end of metallic pipe 116. The lower end of metallic pipe 132 is open at the lower surface of bottom plate 131. The nozzle 115b following the nozzle 115a is formed between the metal plate 112 and the bottom plate 131. In this preferred embodiment, the metallic pipe 132 comprises a metallic pipe integral with the metallic pipe 116.

Figure 20:
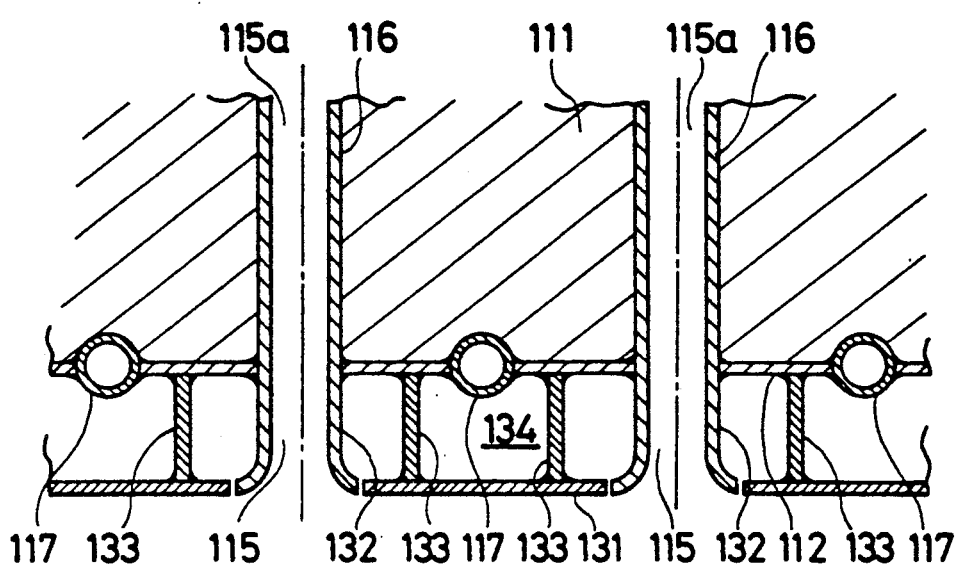
FIG. 20 is a vertical sectional view partially showing a second lower construction of distributor in preferred embodiment 3.

In the center of the distributor 108 is located an ore discharging hole 113, to which an ore discharge pipe 114 is connected. A connecting member 133 as described above is installed as necessary between the bottom plate 131 and the metal plate 112 or between the bottom plate 131 and the cooling pipe 117 for heat transfer. To further prevent the cooling of the bottom plate 131, connecting members 133 may be installed between the metal plate 112 and the bottom plate 131, for example, as shown in FIG. 20. As stated above, the connecting members can be installed in any form as necessary. In some cases, the distributor may be constructed without the connecting members.

Figure 21:
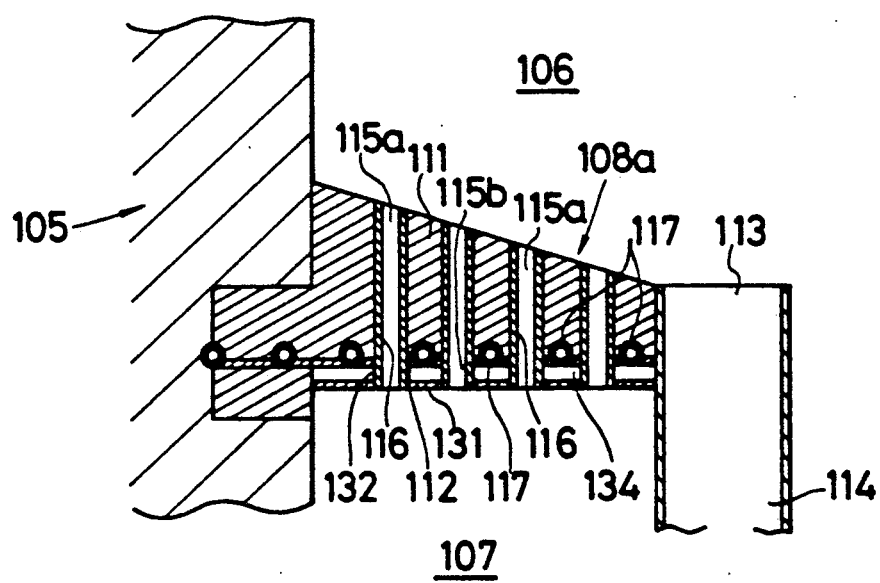
FIG. 21 is a vertical sectional view of a distributor in preferred embodiment 3.

This invention can be applied to not only a distributor with an upper surface conically sloping down toward the center as shown in FIG. 17 but also a distributor with a level upper surface. The sectional form and planar arrangement of cooling pipes 117 are not limited to the above preferred embodiment, but the cooling pipes can be configured in an appropriate form. FIG. 21 shows a distributor in which the cooling pipes are disposed differently. Most part of each cooling pipe 117 of the distributor 108a is embedded in the body 111, and the bottom of cooling pipe 117 is flush with the bottom surface of metal plate 112. Other configurations are the same as those shown in FIG. 17, like reference numerals designating like or corresponding parts in these two figures for omitting the explanation. Instead of the embodiment shown in FIG. 21, the bottom of cooling pipes 117 may be joined to the upper surface of metal plate 112. Alternatively, the cooling pipes 117 may be completely embedded in the body 111 and connected to the metal plate 112 via connecting members. The cooling pipe 117 is preferably joined to the metal plate 12 throughout its length, but may be partially joined via connecting members.

Figure 22:
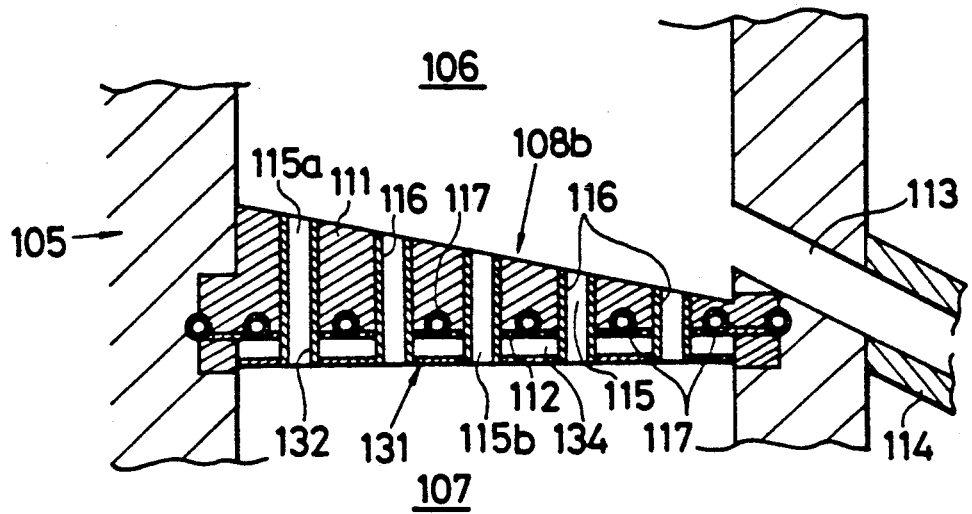
FIG. 22 is a vertical sectional view of a second distributor in preferred embodiment 3.
Figure 23:
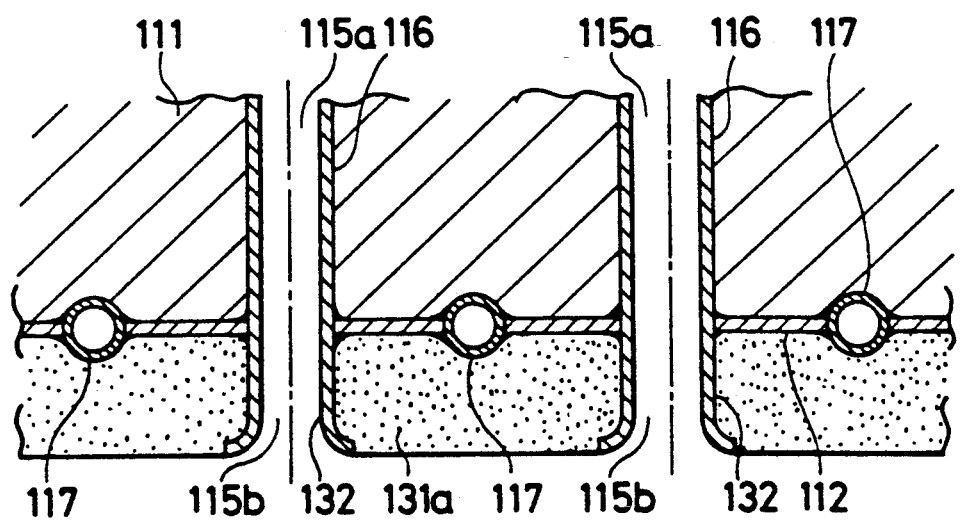
FIG. 23 is a vertical sectional view partially showing a third lower construction of distributor in preferred embodiment 3.
Figure 24:
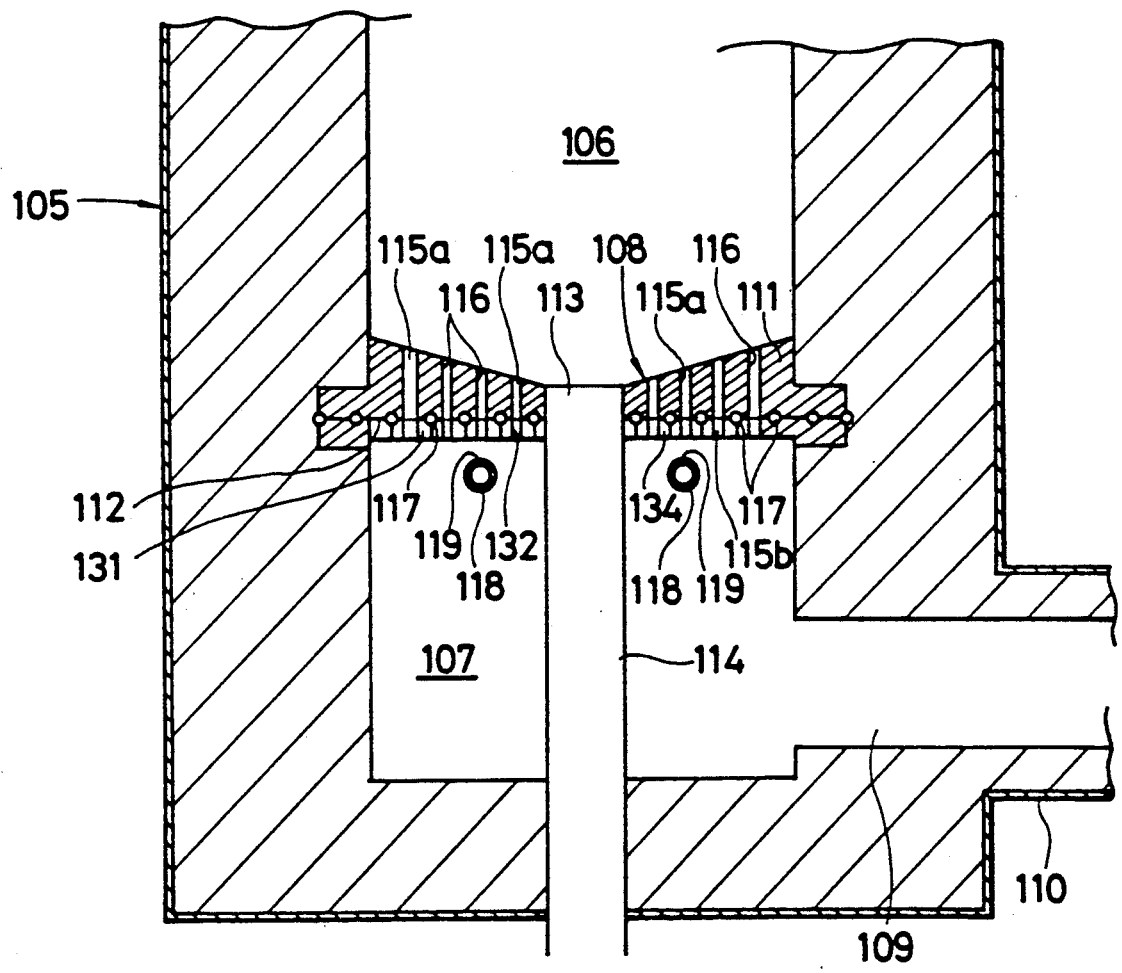
FIG. 24 is a vertical sectional view of the lower part of prereduction furnace having a purging device in preferred embodiment 3.
Figure 25:
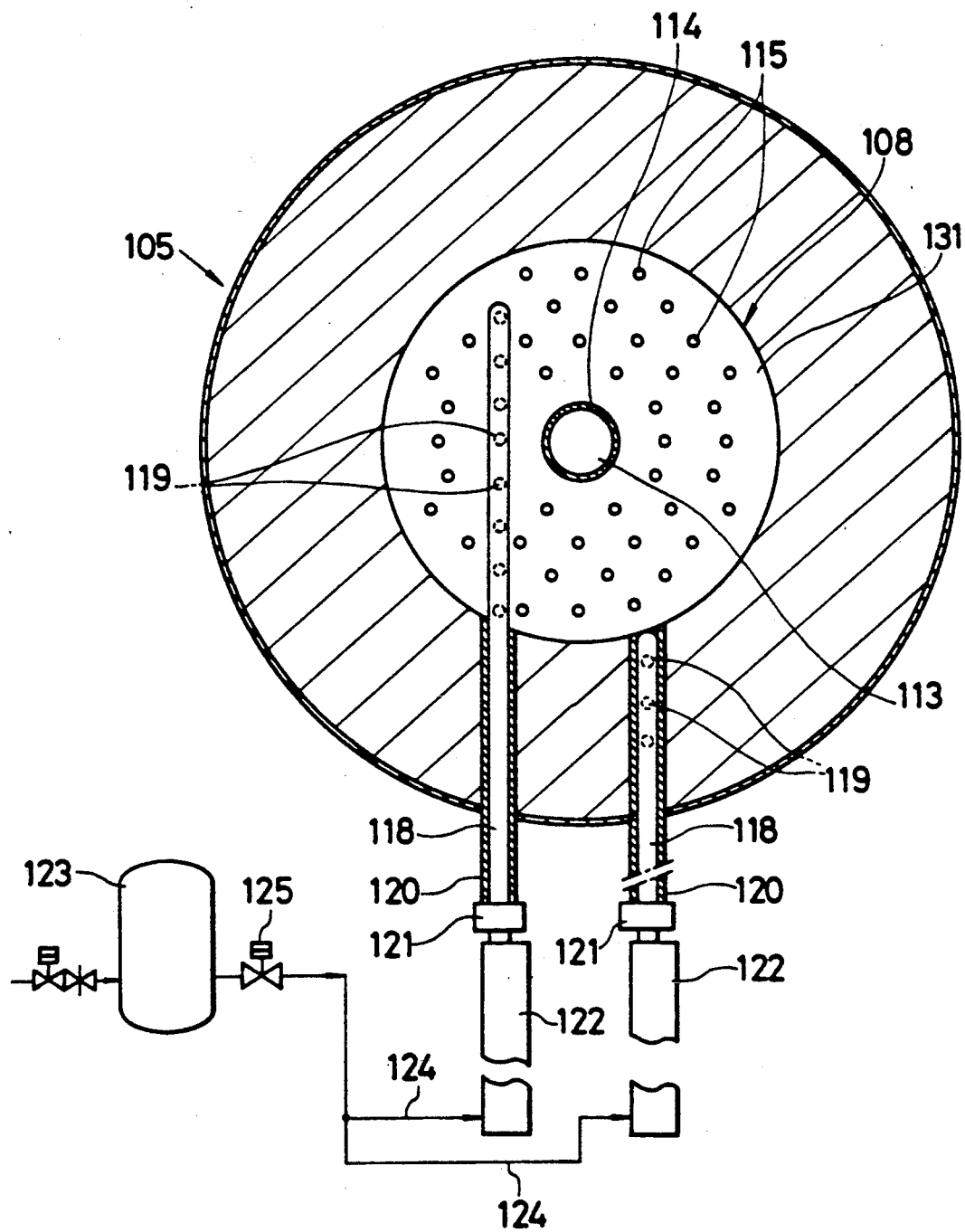
FIG. 25 is a partially sectional view of horizontal arrangement of purging device in preferred embodiment 3.

FIG. 22 shows a preferred embodiment in which the ore discharging hole 113 is located at the side of the distributor 108b. The distributor 108b is constructed so that its upper surface slopes downward toward the ore discharging hole 113. Other configurations are the same as those shown in FIG. 21, like reference numerals designating like or corresponding parts in these two figures for omitting the explanation. In the distributor shown in FIG. 22, the cooling pipes 117 and the metal plate 112 can be constructed as shown in FIG. 17; that is, the cooling pipes 117 can be disposed so that their upper halves are embedded in the body 111. FIG. 23 shows the preferred embodiment in which the bottom plate is brought into direct contact with the metal plate 112. The bottom plate 131a is made of a thick metal plate like a casting. The metallic pipe 132 is disposed at the lower end of the metallic pipe 116 and passes through the bottom plate 131a. The nozzle 115b follows the nozzle 115a. The material of the bottom plate 131a is preferably a metal because of better heat transfer. The bottom plate 131a may be sometimes of refractory material. FIGS. 24 and 25 show a preferred embodiment in which purging pipes are installed below the distributor. The configuration of distributor is the same as that shown in FIG. 17. Below the distributor, two purging pipes 118 are installed in a horizontally movable manner so that the ore discharge pipe is interposed between them. Each of the purging pipes 118 has a plurality of gas injection outlets 119 facing the bottom of the distributor. The furnace body 105 has sleeves 120 passing through its side wall. The purging pipe 118 can be moved into and out of the blowing chamber 107 through the sleeve 120. To move the purging pipes 118 horizontally, driving mechanisms 121 are installed outside the furnace body. The driving mechanism 121 is, for example, made up of a reciprocating chain that is locked to a protrusion on the furnace outside. Therefore, the reciprocating movement of the chain allows the purging pipe 118 to move into and out of the blowing chamber 107 through the sleeve 120. To the rear end of purging pipe 118 extending from the furnace is connected a gas blowing pipe 122, to which a gas supply pipe 124 is connected from a gas source 123. A valve 125 is installed midway in the gas supply pipe 124.

The purging pipe 118 may be so constructed as to be rotated around its axis by a driving mechanism not shown in the figure. These purging pipes can be installed in the furnace having the distributor shown in FIG. 21 or 22.

Figure 26:
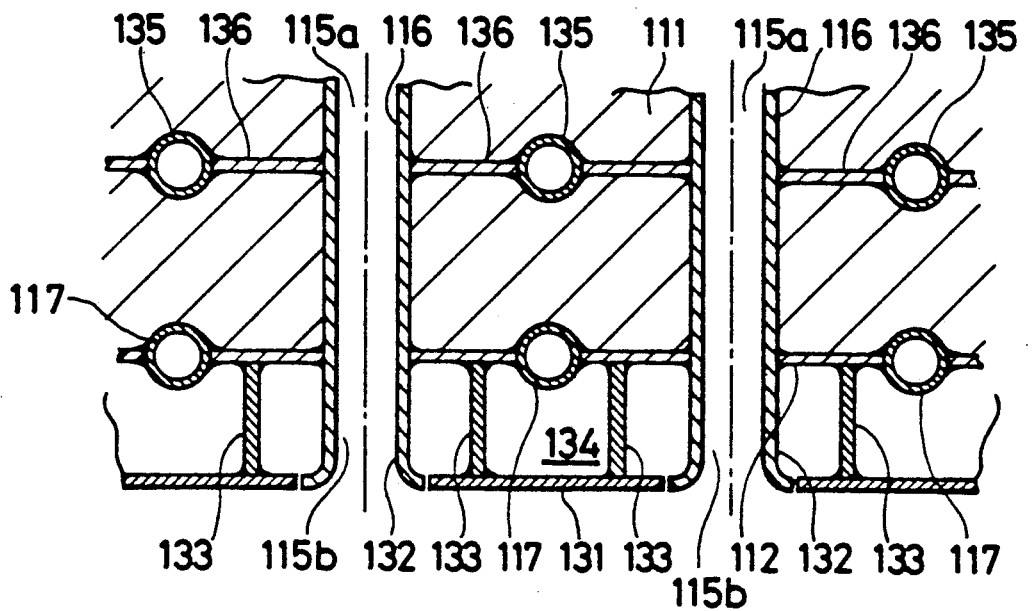
FIG. 26 is a vertical sectional view partially showing a fourth lower construction of distributor in preferred embodiment 3.
Figure 27:
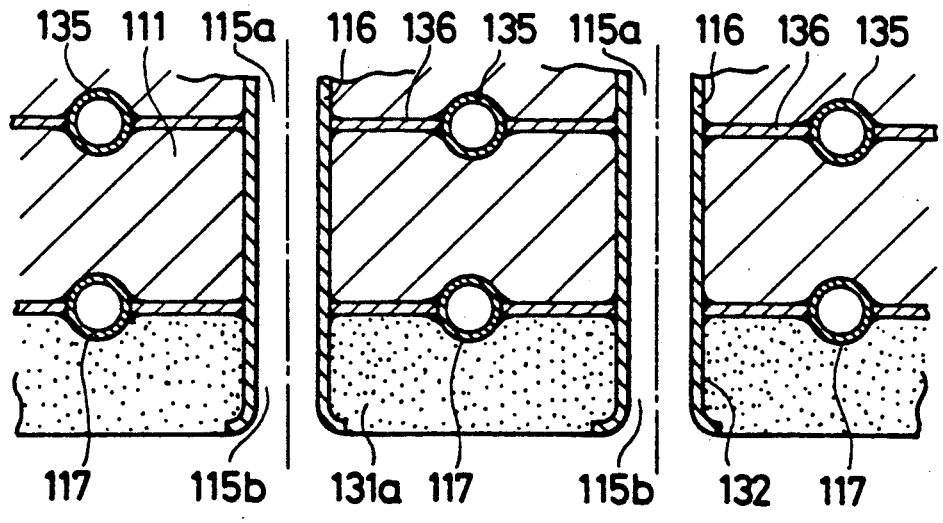
FIG. 27 is a vertical sectional view partially showing a fifth lower construction of distributor in preferred embodiment 3.

In this preferred embodiment, in addition to the cooling pipes 117, other cooling pipes may be embedded in the body 111 at positions above the cooling pipes 117. The cooling pipes may be directly joined to the metallic pipes 116, or may be connected to the metallic pipes 116 or the metal plate 112 via connecting members 134. FIGS. 26 and 27 show other embodiments. The cooling pipes 135 are embedded in the body 111 above the cooling pipes 117. The cooling pipe 135 is connected to the metallic pipe 116 by the connecting member 134 of a metal plate or the like.

Next, the operation of preferred embodiment 3 is explained. A cooling fluid like water is allowed to flow in the cooling pipes 117 composing the distributor 108, 108a, or 108b. The cooling fluid cools down the metal plate 112 connected to the cooling pipes 117. Then, the metallic pipes 116 and 132 inserted in the nozzles are cooled via the metal plate 112. Any adherent dust in the reducing gas adhering to the inside of metallic pipe 116 will rapidly solidify, so that it can be easily removed.

In the distributor of the construction shown in FIGS. 17 to 19, the lower surface of bottom plate 131 constituting the distributor bottom is slowly cooled by the cooling fluid in the cooling pipes 117 via the chamber 134 formed between the metal plate 112 and the bottom plate 131, the metallic pipes 132 installed between the metal pipe 112 and the bottom plate 131, and the connecting members 133. In the distributor of the construction shown in FIG. 23, the lower surface of the bottom plate 131 constituting the distributor bottom is slowly cooled by the cooling fluid in the cooling pipes 117 via the bottom plate 131a. Any dust adhering to the bottom of distributor can be easily peeled off even by such slow cooling because of its small adhesive force. The slow cooling of the distributor bottom prevents the decrease in temperature of reducing gas in contact with the bottom of the distributor.

In this preferred embodiment, the top of distributor 108 is not cooled. This is because any dust adhering to the top of distributor 108 and the outlet of nozzle 115 is readily removed by the violent movement of fluidized ore particles. There is, therefore, almost no adhesion of dust commonly found on the bottom of the distributor and the inside of the nozzle. No cooling of distributor top prevents the decrease in temperature in the fluidized bed due to the heat dissipation from the distributor top.

In the preferred embodiment shown in FIGS. 24 and 25, if dust adheres to the bottom of distributor or the inlet of nozzle, the dust can be easily removed by injecting gas from the purging pipes 118. The purging pipes 118 are normally withdrawn to the outside of the furnace and are advanced into the blowing chamber 107 by means of the driving mechanism 121 as appropriate.

Generally, the conventional distributor made of only a refractory material has a thickness of about 700 mm. The distributor according to this invention has the metal plate 112, cooling pipes 117, and bottom plates 131 and 131a as strength members. The distributor also has high strength because the metal plate 112, cooling pipes 117, and bottom plates 131 and 131a are cooled. For these reasons, the thickness of distributor can be reduced to about 200 mm. Therefore, the area where the reducing gas passing through the nozzle 115 comes into contact with the inside of nozzle is far smaller than with the conventional distributor of refractory material only, so that the decrease in temperature of reducing gas in passing through the nozzle hardly presents any problem.

PREFERRED EMBODIMENT 4

Figure 28:
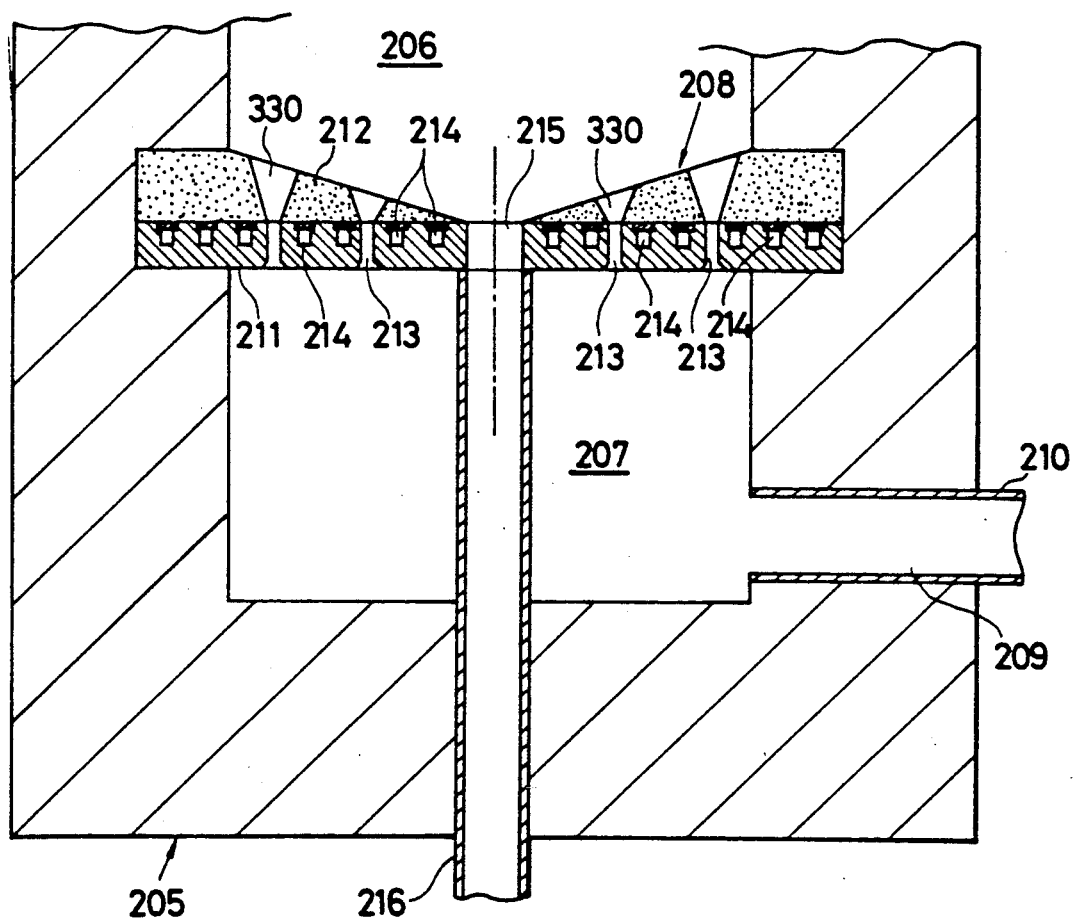
FIG. 28 is a vertical sectional view of the lower part of a second prereduction furnace in preferred embodiment 4.
Figure 29:
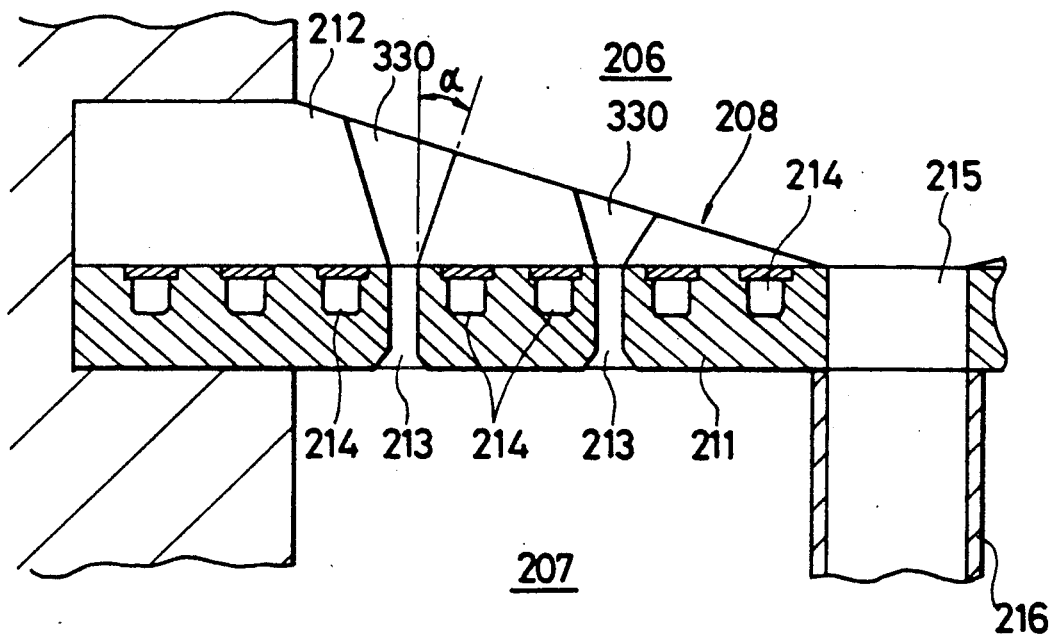
FIG. 29 is a vertical sectional view of distributor in preferred embodiment 4.

FIGS. 28 and 29 show the preferred embodiment 4 of this invention. Reference numeral 205 denotes a body of the prereduction furnace, and 208 denotes a distributor partitioning the inside of the furnace. The upper part of the furnace above the distributor 208 constitutes a prereduction chamber 206, and the lower part below the distributor a blowing chamber 207. The blowing chamber 207 is equipped with a gas blowing inlet 209, to which is connected a gas supply pipe 210 that leads from the smelting reduction furnace.

The distributor 208 comprises a thick plate 211 of high rigidity with passages 214 for a cooling fluid formed therein and a refractory layer 212 placed above the thick plate 211. The thick plate is made of a casting or other metallic or ceramic materials of high rigidity. In this preferred embodiment, the passage 214 has a groove on the top of thick plate 211, and the upper end of the groove is closed by a plate.

The distributor 208 has many vertical nozzles. Each nozzle is comprised of the nozzle 213 in the thick plate 211 and the nozzle 330 in the refractory layer 212. The nozzle 213 connects to the nozzle 330. The nozzle 330 has a diameter increasing upward. The inside angle $\alpha$ of nozzle 330 expanding upward is designed so that fluidized ore particles enter the inside of the nozzle. Generally, the angle $\alpha$ is preferably about 10 to 45 degrees. The thick plate 211 has an intake port and a discharge port for a cooling fluid (not shown) which lead to the passages 214. In the center of the distributor 208 is located an ore discharging hole 215, to which an ore discharge pipe 216 is connected. The thick plate 211 of the distributor 208 is usually made of a casting or the like, and the inner construction of thick plate 211 is not particularly limited.

Figure 30:
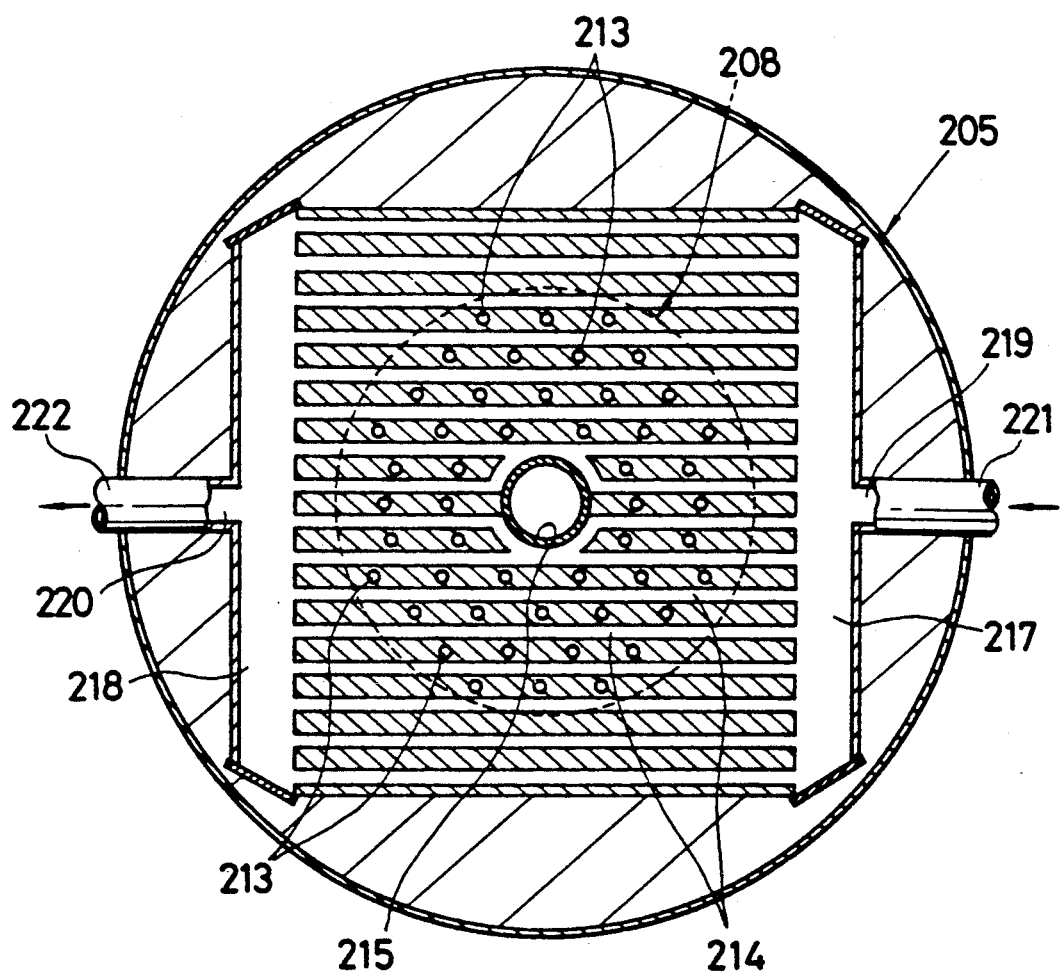
FIG. 30 is a horizontal sectional view of the thick plate of the distributor in preferred embodiment 4.

FIG. 30 shows the inner construction of thick plate 211. In the thick plate 211, many passages 214 are arranged in parallel with each other. Each end of passage 214 is connected to headers 217 and 218. The headers 217 and 218 have an intake port 219 and a discharge port 220 for a cooling fluid, respectively. To the intake port 219 and the discharge port 220 are connected a supply pipe 221 and a discharge pipe 222 for a cooling fluid, respectively. The nozzles 213 are arranged between the passages 214.

Figure 31:
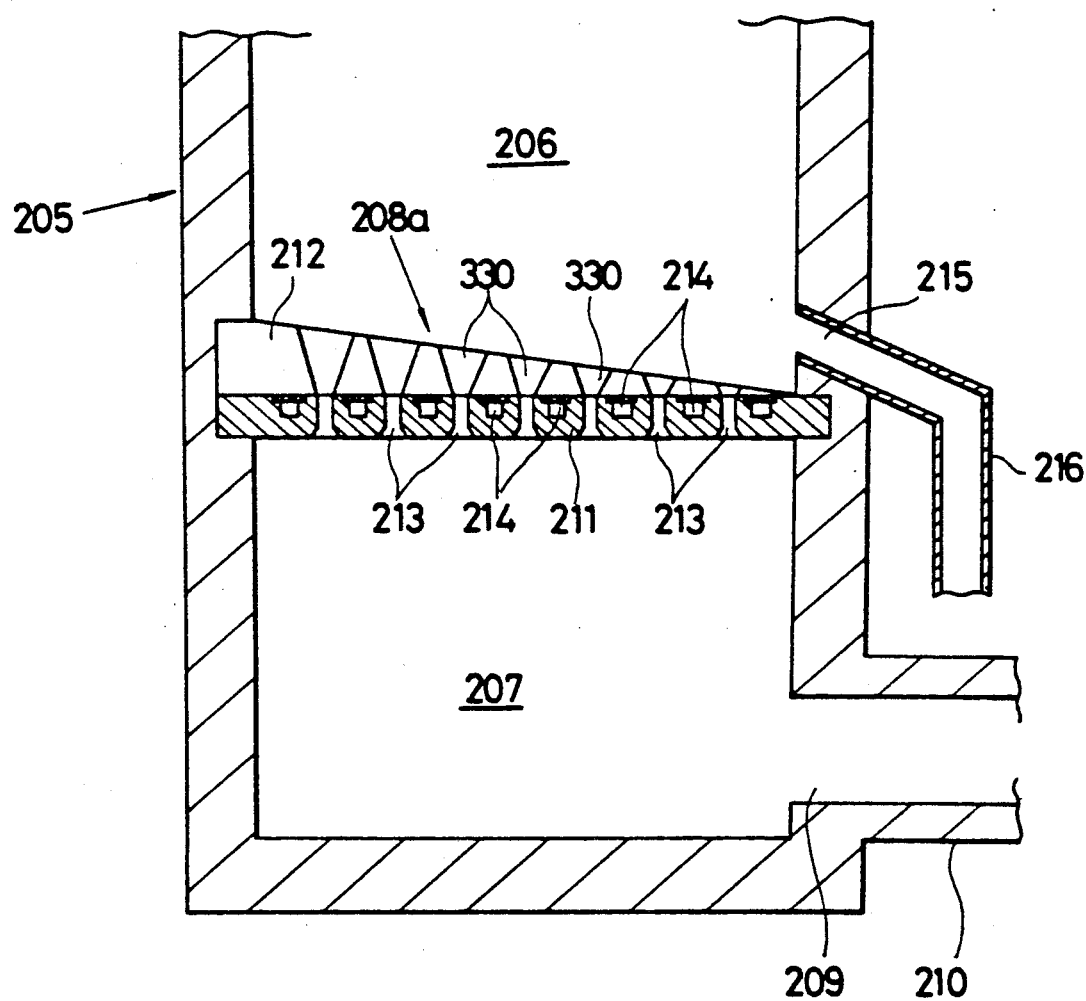
FIG. 31 is a vertical sectional view of the lower part of a third prereduction furnace in preferred embodiment 4.
Figure 32:
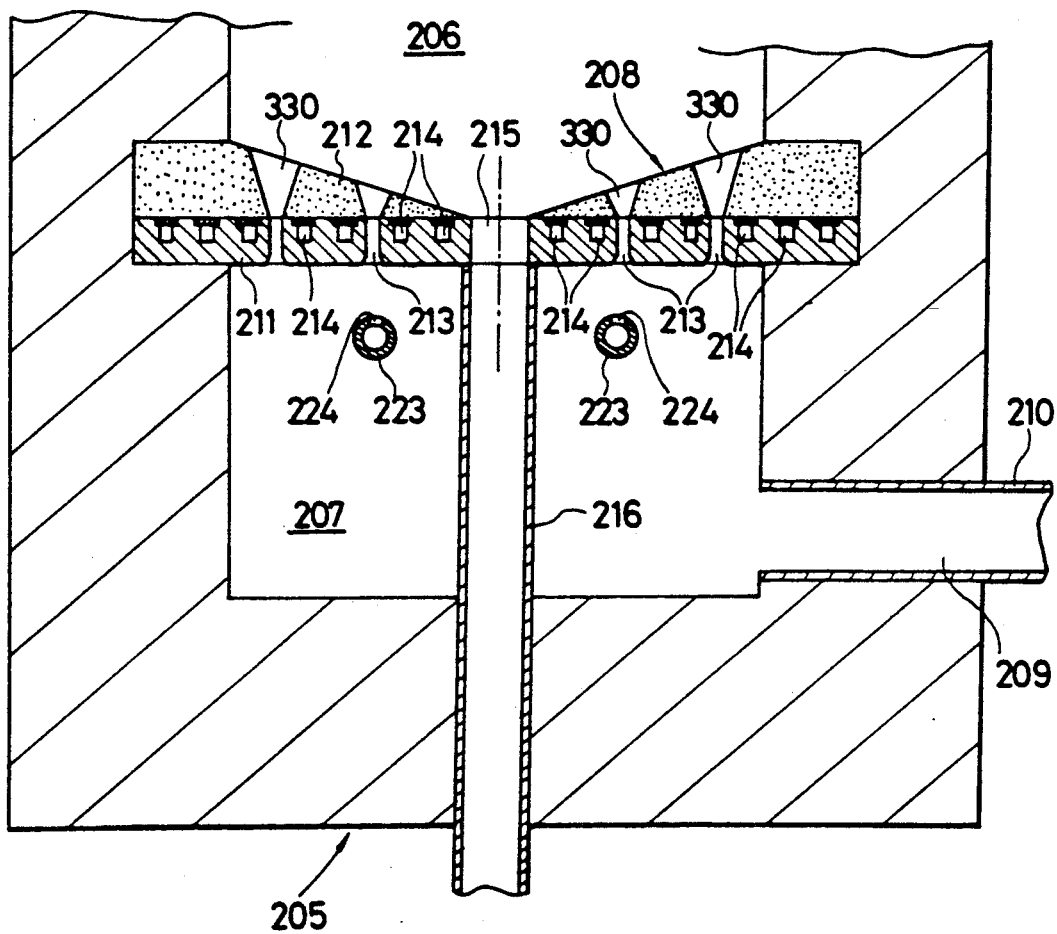
FIG. 32 is a vertical sectional view of the lower part of prereduction furnace having a purging device in preferred embodiment 4.
Figure 33:
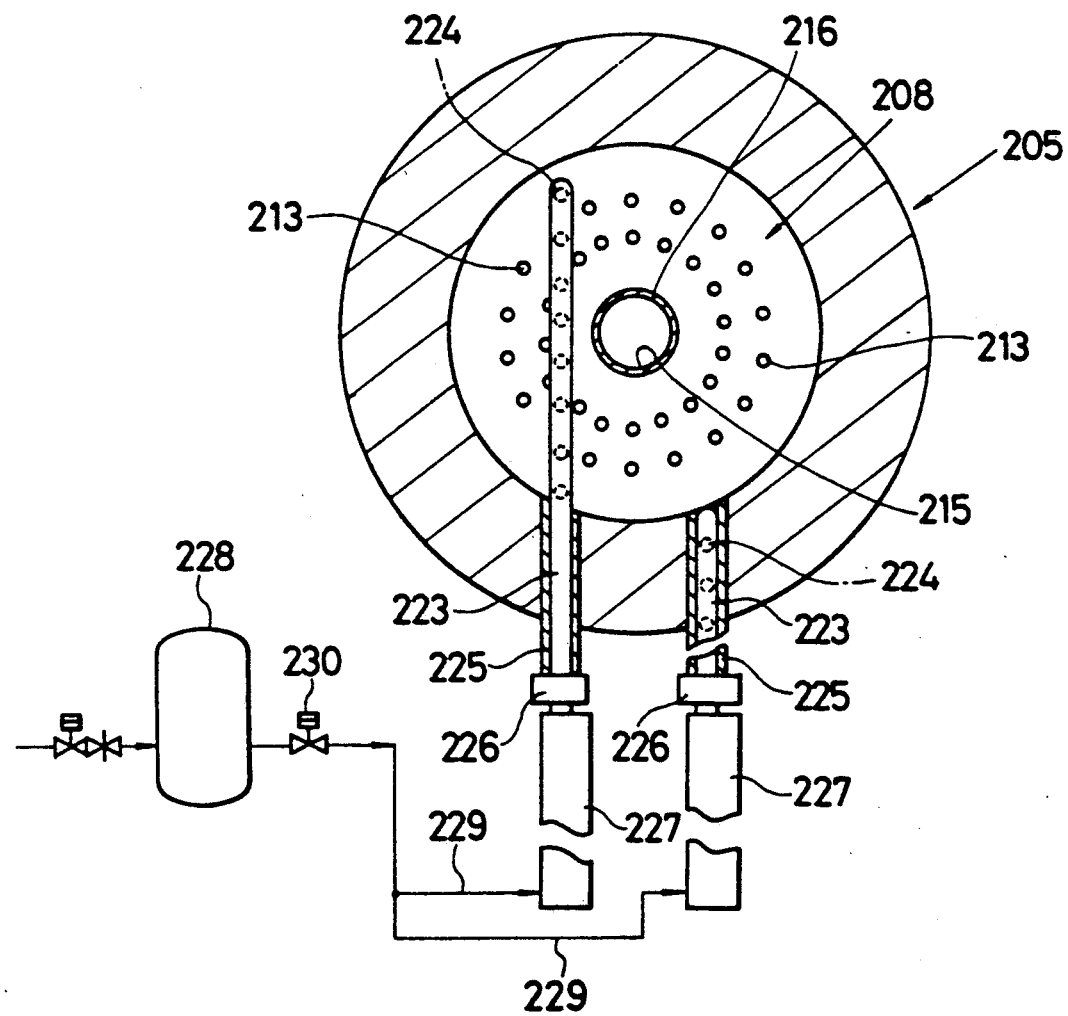
FIG. 33 is a partially sectional view of horizontal arrangement of purging device in preferred embodiment 4.

This invention can be applied to not only a distributor with an upper surface conically sloping down toward the center as shown in FIG. 28 but also a distributor with a level upper surface. FIG. 31 shows a preferred embodiment in which the ore discharging hole 215 is located at the side of the distributor 208a. The distributor 208a is constructed so that its upper surface slopes downward toward the ore discharging hole 215. Other configurations are the same as those shown in FIG. 28, like reference numerals designating like or corresponding parts in these two figures for omitting the explanation. FIGS. 32 and 33 show a preferred embodiment in which purging pipes are installed below the distributor. The configuration of the distributor is the same as that shown in FIG. 28. Below the distributor, two purging pipes 223 are installed in a horizontally movable manner so that the ore discharging pipe 216 is interposed between them. Each of the purging pipes 223 has a plurality of gas injection outlets 224 facing the bottom of distributor. The furnace body 205 has sleeves 225 passing through its side wall. The purging pipe 223 can be moved into and out of the blowing chamber 207 through the sleeve 225. To move the purging pipes 223 horizontally, driving mechanisms 226 are installed outside the furnace body. The driving mechanism 226 is, for example, made up of a reciprocating chain that is locked to a protrusion on the furnace outside. Therefore, the reciprocating movement of the chain allows the purging pipe 223 to move into and out of the blowing chamber 207 through the sleeve 225. To the rear end of purging pipe 223 extending from the furnace is connected a gas blowing pipe 227, to which a gas supply pipe 229 is connected from a gas source 228. A valve 230 is installed midway in the gas supply pipe 229.

The purging pipe 223 may be so constructed as to be rotated around its axis by a driving mechanism not shown in the figure. These purging pipes can be installed in the furnace having the distributor shown in FIG. 31. The thick plate 211 of the distributor has an advantage of being easier to manufacture than the distributor having a combination of pipes and plates because it is made of single plate. Since the distributor is subject to very high temperatures, the distributor having a combination of pipes and plates has difficulties in designing their joints and in manufacturing.

Next, the operation of preferred embodiment 4 is explained. A cooling fluid like water introduced into the thick plate 211 of distributor 208 or 208a flows through a plurality of passages 214 and then is discharged through the discharge port. The cooling fluid decreases the temperature of the bottom of distributor and the inside of nozzle 213. Any adherent dust in the reducing gas adhering to the bottom of distributor and the inside of nozzle 213 will rapidly solidify, so that it can be easily removed.

The refractory layer 212 comprising the upper part of distributor 208 or 208a prevents the decrease in temperature in the fluidized bed due to the heat dissipation from the distributor top. In addition, it properly prevents the wear of distributor top due to the contact with fluidized ore particles. The cooling action of cooling fluid hardly reaches the inside of nozzle 330 in the refractory layer 212. However, the upward increase in inside diameter of nozzle 330 allows ore particles to enter the nozzle 330 and to flow in it, so that the adhesion of dust is prevented by the flow of ore particles.

In the preferred embodiment shown in FIGS. 32 and 33, if dust adheres to the bottom of distributor or the inlet of nozzle, the dust can be easily removed by injecting gas from the purging pipes 223. The purging pipes 223 are normally withdrawn to the outside of furnace and are advanced into the blowing chamber 207 by means of the driving mechanism 226 as appropriate. Generally, the conventional distributor made of only a refractory material has a thickness of about 700 mm. The distributor according to this invention has high strength because its thick plate 211 is made of a metal or other rigid materials and is cooled. For this reason, the thickness of the distributor can be reduced to about 200 mm. Therefore, the area where the reducing gas passing through the nozzle 213 comes into contact with the inside of the nozzle is far smaller than with the conventional distributor of refractory material only, so that the decrease in temperature of reducing gas in passing through the nozzle hardly presents any problem.

Figure 34:
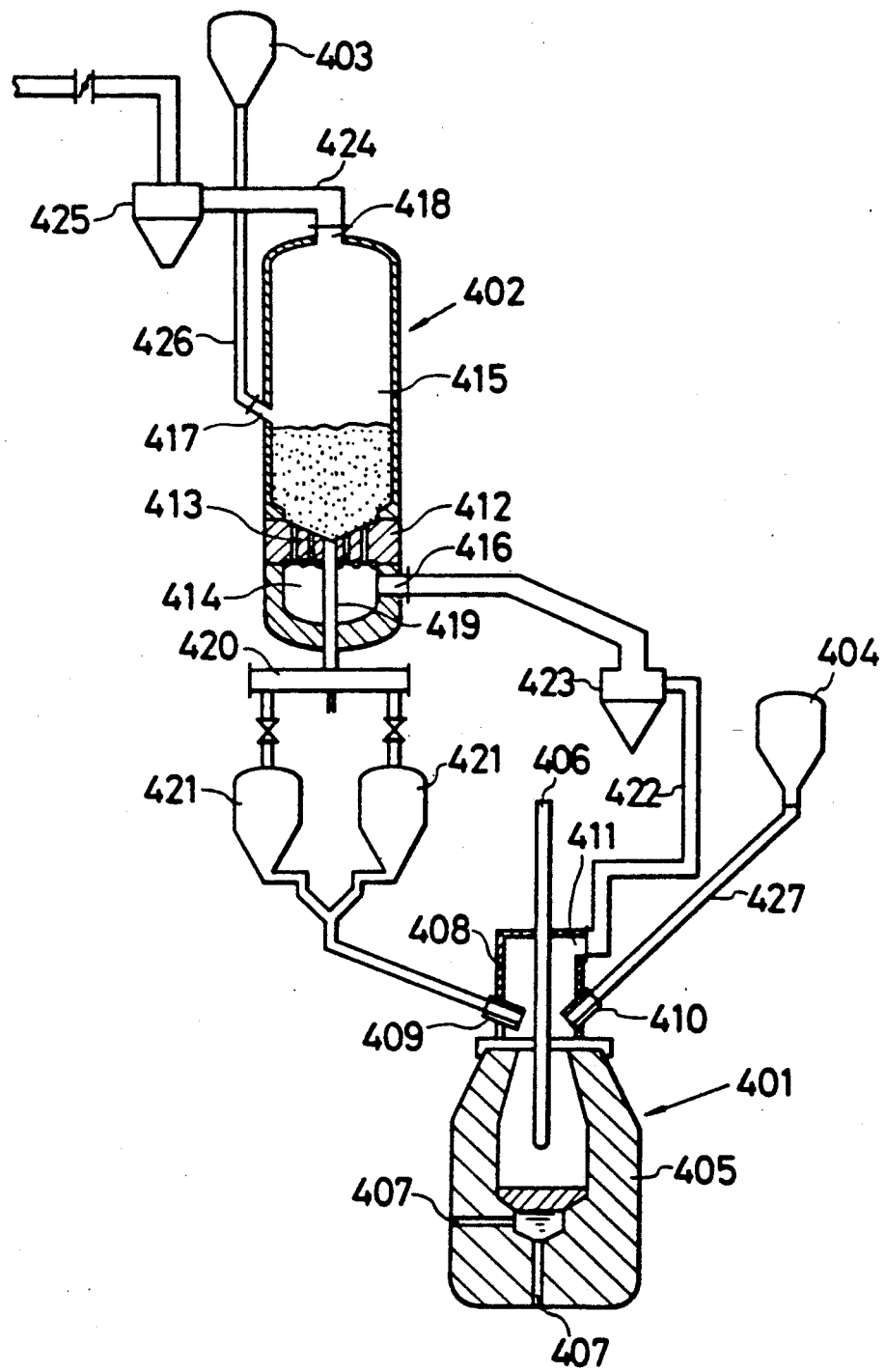
FIG. 34 is a schematic view of a smelting reduction facility according to this invention.

FIG. 34 is a schematic view of a smelting reduction facility according to this invention. As shown in FIG. 34, the smelting reduction facility comprises a smelting reduction furnace 401 of a converter type, a prereduction furnace 402 for prereducing iron ore of a main raw material supplied to the smelting reduction furnace 401, a reservoir 403 of main raw material, and a reservoir 404 of auxiliary materials. The smelting reduction furnace 401 comprises a furnace body 405 of a converter type, a lance 406 vertically inserted into the furnace body 405 through the throat of furnace body 405, stirring gas blowing inlets 407 installed in the bottom and side walls of furnace body 405, a chute 409 installed in a hood 408 covering the throat for supplying main raw material, a chute 410 for supplying auxiliary materials, and a gas discharge outlet 411.

The prereduction furnace 402 comprises a distributor 412 having many nozzles 413 installed at the lower position of the furnace, a blowing chamber 414 formed below the distributor 412, and a prereduction chamber 415 formed above the distributor 412 in the furnace. The blowing chamber 414 has a gas blowing inlet 416, and the prereduction chamber 415 has a chute 417 for supplying raw material and a gas discharge outlet 418.

An ore discharging hole is installed in the center of the distributor, and to the ore discharging hole is connected an ore discharging pipe 419 for discharging the iron ore that has been prereduced. The ore discharging pipe 419, passing through the bottom wall of prereduction furnace 402, extends downward and is connected to the chute 409 of smelting reduction furnace 401 through an L-shaped valve 420 and two intermediate reservoirs 421.

To the gas discharge outlet 411 installed in the hood 408 of smelting reduction furnace 401 is connected a gas supply pipe 422 leading to the gas blowing inlet 416 installed in the blowing chamber 414 of the prereduction furnace 402. A dust collecting cyclone 423 is installed midway in the gas supply pipe 422.

A gas discharge pipe 424 is connected to the gas discharge outlet 418 of the prereduction furnace 402, and a dust collecting cyclone 425 is installed in the gas discharge pipe 424.

The reservoir 403 of main raw material is connected to the chute 417 for suppling raw material to the prereduction furnace 402 by a duct 426, while the reservoir 404 of auxiliary materials is connected to the chute 410 for supplying auxiliary materials to the smelting reduction furnace 401.

What is claimed is:

1. A prereduction furnace of a smelting reduction facility of iron ore comprising:

a fluidizing prereduction chamber installed in the upper part of said prereduction furnace wherein said iron ores are fed and prereduced;

a gas blowing chamber installed in the lower part of said prereduction wherein a reducing gas is fed;

a distributor for separating said fluidizing prereduction chamber from said gas blowing chamber;

a discharge pipe for discharging the prereduced ore from said fluidizing prereduction chamber; and said distributor including:
 a body of refractory material;
 a metal plate installed on the bottom of said body;
 nozzles passing through said body and said metal plate;
 metallic pipes inserted in said nozzles: and
 cooling pipes connected to said metal plate.

2. A prereduction furnace according to claim 1, wherein said cooling pipes are joined to the metal plate by welding.

3. A prereduction furnace according to claim 1, wherein said cooling pipes are embedded in the body and connected to the metal plate via connecting members.

4. A prereduction furnace according to claim 1, further comprising at least two horizontally movable purging pipes installed below the distributor, each of said purging pipes having a plurality of outlets.

5. A prereduction furnace according to claim 1, wherein said discharge pipe is located in the bottom center of said prereduction chamber and passes through the body and metal plate of the distributor and the bottom wall of the gas blowing chamber.

6. A prereduction furnace according to claim 1, wherein said discharge pipe is installed in the side wall of said prereduction chamber.

7. A prereduction furnace of a smelting reduction facility of iron ore comprising:

a fluidizing prereduction chamber in the upper part of said prereduction furnace wherein iron ores are fed and prereduced;

a gas blowing chamber installed in the lower part of said prereduction furnace wherein a reducing gas is supplied;

a distributor for separating said fluidizing prereduction chamber from said gas blowing chamber;

a discharge pipe for discharging the prereduced ore from said fluidizing prereduction chamber; and said distributor including;
 a body of refractory material;
 a metal plate installed on bottom of said body;
 first nozzles passing through said body and said metal plate;
 metallic pipes inserted in said nozzles;
 cooling pipes connected to said metal plate; and
 a metallic box which is installed below said metal plate and has passages for flowing a gas, said metallic box having second nozzles following said first nozzles.

8. A prereduction furnace according to claim 7, further comprising at least two horizontally movable purging pipes installed below the distributor, each of said purging pipes having a plurality of gas injection outlets.

9. A prereduction furnace according to claim 7, wherein said discharge pipe is located in the bottom center of said prereduction chamber and passes through the body and metal plate of said distributor and the bottom wall of said gas blowing chamber.

10. A prereduction furnace according to claim 7, wherein said discharge pipe is installed in the side wall of said prereduction chamber.

11. A prereduction furnace of a smelting reduction facility of iron ore comprising:

a fluidizing prereduction chamber in the upper part of said prereduction furnace wherein iron ores are fed and prereduced;

a gas blowing chamber installed in the lower part of said prereduction furnace wherein a reducing gas is fed;

a distributor for separating said fluidizing prereduction chamber from said gas blowing chamber;

a discharge pipe for discharging the prereduced ore from said fluidizing prereduction chamber; and said distributor including:
 a body of refractory material;
 a metal plate installed on the bottom of said body;
 nozzles passing through said body and said metal plate;
 first metallic pipes inserted in said nozzles;
 cooling pipes connected to said metal plate;
 a bottom plate spaced from said metal plate thereunder; and
 second metallic pipes connected to the lower ends of said first metallic pipes, lower ends of second metallic pipes leading to the lower surface of said bottom plate, and said metal plate, said bottom plate and said second metallic pipes forming a chamber surrounded by them.

12. A prereduction furnace according to claim 11, further comprising connecting members170 to said bottom plate.

13. A prereduction furnace according to claim 11, further comprising connecting members for connecting said metal plate to said bottom plate.

14. A prereduction furnace according to claim 11, further comprising at least two horizontally movable purging pipes installed below the distributor, each of said purging pipes having a plurality of gas injection outlets.

15. A prereduction furnace according to claim 11, wherein said discharge pipe is located in the bottom center of said prereduction chamber and passes through the body and metal plate of said distributor and the bottom wall of said gas blowing chamber.

16. A prereduction furnace according to claim 11, wherein said discharge pipe is installed in the side wall of said prereduction chamber.

17. A prereduction furnace of a smelting reduction facility of iron ore comprising:

a fluidizing prereduction chamber in the upper part of said prereduction furnace wherein iron ores are fed and prereduced;

a blowing chamber installed in the lower part of said prereduction furnace wherein a reducing gas is fed;

a distribution for separating said fluidizing prereduction chamber from said blowing chamber;

a discharge pipe for discharging the prereduced ore from said fluidizing prereduction chamber; and said distributor including:
 a body of refractory material;
 a metal plate installed on the bottom of said body;
 nozzles passing through said body and said metal plate;
 first metallic pipes inserted in said nozzles;
 cooling pipes connected to said metal plate;
 a bottom plate fixed below said metal plate; and second metallic pipes connected to the lower ends of said first metallic pipes, lower ends of said second metallic pipes leading to the lower surface of said bottom plate.

18. A prereduction furnace according to claim 17, further comprising at least two horizontally movable purging pipes installed below the distributor, each of said purging pipes having a plurality of gas injection outlets.

19. A prereduction furnace according to claim 17, wherein said discharge pipe is located in the bottom center of said prereduction chamber and passes through the body and metal plate of said distributor and the bottom wall of said blowing chamber.

20. A prereduction furnace according to claim 17, wwherin said ore discharging pipe is installed in the side wall of said prereduction chamber.

21. A prereduction furnace of a smelting reduction facility of iron ore comprising:
   a fluidizing prereduction chamber in the upper part of said prereduction furnace wherein iron ores are fed and prereduced;
   a gas blowing chamber installed in the lower part of said prereduction furnace wherein a reducing gas is fed;
   a distributor for separating said fluidizing prereduction chamber from said gas blowing chamber;
   a discharge pipe for dicharging the prereduced ore from said fluidizing prereduction chamber; and
   said distributor including:
      a rigid thick plate having passages for flowing a cooling fluid and having first nozzles opening in the vertical direction; and
      a refractory layer installed on top of said thick plate, said refractory layer having second nozzles whose diameter expands upward.

22. A prereduction furnace according to claim 21, further comprising at least two horizontally movable purging pipes installed below the distributor, each of said purging pipes having a plurality of gas injection outlets.

23. A prereduction furnace according to claim 21, wherein said discharge pipe is located in the bottom center of said prereduction chamber and passes through the body and metal plate of said distributor and the bottom wall of said gas blowing chamber.

24. A prereduction furnace according to claim 21, wherein said discharge pipe is installed in the side wall of said prereduction chamber.

* * * * *

UNITED STATES PATENT AND TRADEMARK OFFICE
CERTIFICATE OF CORRECTION

PATENT NO. : 5,129,630

DATED : July 14, 1992

INVENTOR(S) : ARIYAMA ET AL

It is certified that error appears in the above-identified patent and that said Letters Patent is hereby corrected as shown below:

Column 5, line 37, delete "composing".

Column 5, line 62, insert --the-- after "outside of".

Column 5, line 63, delete "the" after "bottom of".

Column 6, line 1, replace "116" with --from the bottom of metal plate 12, the reducing gas is less--.

Column 8, line 42, before "distributor", insert --the--.

Column 15, line 15 (claim 1), following "nozzles" change ":" to --;--.

Column 15, line 31 (claim 5), change "of the distributor" --of said distributor--.

Column 15, line 32 (claim 5), change "of the gas" to --of said gas--.

Column 15, line 49 (claim 7), following "including" change ";" to --:--.

UNITED STATES PATENT AND TRADEMARK OFFICE
CERTIFICATE OF CORRECTION

PATENT NO. : 5,129,630

DATED : July 14, 1992

INVENTOR(S) : ARIYAMA ET AL

It is certified that error appears in the above-identified patent and that said Letters Patent is hereby corrected as shown below:

Column 16, line 32 (claim 12), replace "170" with

--for connecting said cooling pipes--.

Column 17, line 16 (claim 20), change "wwherein" to

--wherein--.

Signed and Sealed this

First Day of February, 1994

*Attest:*

BRUCE LEHMAN

*Attesting Officer*   *Commissioner of Patents and Trademarks*